United States Patent
Fernandez

(10) Patent No.: US 11,030,599 B2
(45) Date of Patent: Jun. 8, 2021

(54) SMART BEACON POINT OF SALE (POS) INTERFACE

(71) Applicant: Netclearance Systems, Inc., Escondido, CA (US)

(72) Inventor: David Fernandez, Escondido, CA (US)

(73) Assignee: Netclearance Systems, Inc., Escondido, CA (US)

(*) Notice: Subject to any disclaimer, the term of this patent is extended or adjusted under 35 U.S.C. 154(b) by 0 days.

(21) Appl. No.: 15/449,886

(22) Filed: Mar. 3, 2017

(65) Prior Publication Data
US 2017/0178104 A1    Jun. 22, 2017

Related U.S. Application Data

(63) Continuation-in-part of application No. 14/606,728, filed on Jan. 27, 2015, and a continuation-in-part of
(Continued)

(51) Int. Cl.
*G06Q 20/20* (2012.01)
*H04W 4/33* (2018.01)
(Continued)

(52) U.S. Cl.
CPC ......... *G06Q 20/202* (2013.01); *G06Q 20/327* (2013.01); *G06Q 30/0261* (2013.01);
(Continued)

(58) Field of Classification Search
CPC ..................... G06Q 20/202; G06Q 30/0281
See application file for complete search history.

(56) References Cited

U.S. PATENT DOCUMENTS

| 6,601,039 B1* | 7/2003 | Kolls | G06Q 30/0253 |
| | | | 705/14.23 |
| 6,769,607 B1* | 8/2004 | Pitroda | G06K 7/0013 |
| | | | 235/380 |

(Continued)

OTHER PUBLICATIONS

Oliveira, L.M. and Rodrigues, J.J., 2011. Wireless Sensor Networks: A Survey on Environmental Monitoring. JCM, 6(2), pp. 143-151. (Year: 2011).*
(Continued)

*Primary Examiner* — David J Stoltenberg
*Assistant Examiner* — Robert C Johnson
(74) *Attorney, Agent, or Firm* — Genius Patent APC; Bruce Angus Hare

(57) ABSTRACT

A smart beacon includes: a connector able to be coupled to a point of sale (POS) terminal and allowing two-way communication between the smart beacon and the POS terminal; a wireless transceiver allowing two-way communication with a user device; and a network interface allowing two-way communication with a remote server. A POS system includes: a POS terminal; a network-accessible payment processing server; and a smart beacon communicatively coupled to the POS terminal and able to communicate with the network-accessible payment processing server. An automated method of processing a payment includes: transmitting a beacon signal; identifying a consumer check-in event based at least partly on a received response to the beacon signal; retrieving charge information from a POS terminal; retrieving payment information from a user device; sending the retrieved charge and payment information for processing at a remote processing entity; and returning a result comprising one of a rejection and authorization.

19 Claims, 30 Drawing Sheets

Related U.S. Application Data application No. 13/752,213, filed on Jan. 28, 2013, now Pat. No. 10,586,251, said application No. 14/606,728 is a continuation-in-part of application No. 13/752,213, filed on Jan. 28, 2013, now Pat. No. 10,586,251.

(60) Provisional application No. 61/603,065, filed on Feb. 24, 2012.

(51) Int. Cl.
| | | |
|---|---|---|
| *H04W 4/38* | (2018.01) | |
| *H04W 4/029* | (2018.01) | |
| *H04W 4/02* | (2018.01) | |
| *G06Q 30/02* | (2012.01) | |
| *G06Q 20/32* | (2012.01) | |
| *H04W 4/021* | (2018.01) | |

(52) U.S. Cl.
CPC ..... *G06Q 30/0267* (2013.01); *G06Q 30/0281* (2013.01); *H04W 4/023* (2013.01); *H04W 4/029* (2018.02); *H04W 4/33* (2018.02); *H04W 4/38* (2018.02); *H04W 4/021* (2013.01)

(56) References Cited

U.S. PATENT DOCUMENTS

| | | |
|---|---|---|
| 6,776,334 B1 | 8/2004 | Garg |
| 6,907,238 B2 | 6/2005 | Leung |
| 7,907,571 B2 | 3/2011 | Raghothaman et al. |
| 8,116,749 B2 | 2/2012 | Proctor, Jr. et al. |
| 8,279,067 B2 | 10/2012 | Berger et al. |
| 8,484,076 B2 | 7/2013 | Roberts et al. |
| 8,489,112 B2 | 7/2013 | Roeding et al. |
| 8,583,475 B2 | 11/2013 | Wills |
| 9,219,979 B2 | 12/2015 | Moldaysky et al. |
| 9,491,584 B1 | 11/2016 | Mendelson |
| 2002/0065680 A1* | 5/2002 | Kojima ............ G07F 7/02 705/21 |
| 2003/0137968 A1 | 7/2003 | Lareau et al. |
| 2004/0026503 A1 | 2/2004 | Gantz |
| 2006/0031126 A1 | 2/2006 | Ma et al. |
| 2006/0287813 A1 | 12/2006 | Quigley |
| 2006/0293968 A1 | 12/2006 | Brice et al. |
| 2007/0030824 A1 | 2/2007 | Ribaudo et al. |
| 2007/0067200 A1 | 3/2007 | Patel |
| 2007/0241184 A1* | 10/2007 | Lum ............ G07G 1/0018 235/380 |
| 2007/0254674 A1 | 11/2007 | Pedigo et al. |
| 2008/0040219 A1 | 2/2008 | Kim et al. |
| 2008/0091541 A1 | 4/2008 | Law et al. |
| 2008/0109317 A1 | 5/2008 | Singh |
| 2008/0214151 A1* | 9/2008 | Ramer ............ G06F 16/68 455/414.1 |
| 2009/0224909 A1 | 9/2009 | Derrick et al. |
| 2009/0322510 A1* | 12/2009 | Berger ............ G06Q 10/0833 340/539.1 |
| 2010/0036772 A1 | 2/2010 | Arceneaux |
| 2010/0161433 A1* | 6/2010 | White ............ G06Q 20/32 705/17 |
| 2010/0185504 A1 | 7/2010 | Rajan et al. |
| 2010/0245588 A1 | 9/2010 | Waehner et al. |
| 2011/0028093 A1 | 2/2011 | Patel et al. |
| 2011/0028160 A1* | 2/2011 | Roeding ............ H04W 4/02 455/456.1 |
| 2011/0178863 A1 | 7/2011 | Daigle |
| 2011/0179064 A1 | 7/2011 | Russo |
| 2011/0191438 A1 | 8/2011 | Huibers et al. |
| 2011/0238476 A1 | 9/2011 | Carr et al. |
| 2011/0276385 A1* | 11/2011 | Keller ............ G06Q 30/0238 705/14.38 |
| 2011/0276419 A1* | 11/2011 | Johnson ............ G06Q 30/0281 705/17 |
| 2011/0302017 A1 | 12/2011 | Marti et al. |
| 2012/0047011 A1 | 2/2012 | Rippetoe et al. |
| 2012/0084210 A1* | 4/2012 | Farahmand ............ G06Q 20/40 705/64 |
| 2012/0116861 A1 | 5/2012 | Dobyns |
| 2012/0191376 A1* | 7/2012 | Soles ............ G01M 5/0066 702/38 |
| 2012/0315839 A1 | 12/2012 | Mumcuoglu et al. |
| 2013/0058796 A1 | 3/2013 | Gerz et al. |
| 2013/0144731 A1* | 6/2013 | Baldwin ............ G06Q 20/204 705/17 |
| 2013/0210461 A1 | 8/2013 | Moldavsky et al. |
| 2013/0268353 A1 | 10/2013 | Zeto, III et al. |
| 2013/0275198 A1 | 10/2013 | Zeto, III et al. |
| 2013/0297422 A1 | 11/2013 | Hunter et al. |
| 2014/0087752 A1 | 3/2014 | Zhu et al. |
| 2016/0012422 A1 | 1/2016 | Chitilian et al. |
| 2017/0195339 A1 | 7/2017 | Brown |
| 2019/0158353 A1 | 5/2019 | Johnson et al. |

OTHER PUBLICATIONS

Ferrari, G., Medagliani, P., Di Piazza, S. and Martalò, M., 2007. Wireless sensor networks: Performance analysis in indoor scenarios. EURASIP Journal on Wireless Communications and Networking, 2007, pp. 1-14. (Year: 2007).*

Yungeun Kim et al., Smartphone-Based Collaborative and Autonomous Radio Fingerprinting, IEEE Transactions on Systems, Man, and Cybernetics, Part C, Jan. 2012, 12 pages, vol. 42 Issue 1, IEEE.

* cited by examiner

SMART BEACON POINT OF SALE (POS) INTERFACE

CROSS-REFERENCE TO RELATED APPLICATIONS

This application is a continuation-in-part of U.S. patent application Ser. No. 14/606,728, filed on Jan. 27, 2015 which is a continuation-in-part of U.S. patent application Ser. No. 13/752,213, filed on Jan. 28, 2013 which claims priority to U.S. Provisional Patent Application Ser. No. 61/603,065, filed on Feb. 24, 2012. This application is a continuation-in-part of U.S. patent application Ser. No. 13/752,213, filed on Jan. 28, 2013 which claims priority to U.S. Provisional Patent Application Ser. No. 61/603,065, filed on Feb. 24, 2012.

BACKGROUND

Many retail establishments utilize registers or other point of sale devices that are not able to process wireless transactions such as payment initiated through a smartphone. Replacement terminals may be expensive, include a learning curve, and/or otherwise burden the establishments.

Thus there is a need for a solution that allows various establishments to retrofit existing point of sale terminals to allow wireless invoicing and payment.

SUMMARY

Some embodiments may provide a smart beacon device that is able to connect to existing point of sale (POS) systems. The smart beacon may include a physical connector able to be coupled to a POS terminal in order to allow two-way communication between the smart beacon and the POS terminal. In addition, the smart beacon may include a wireless transceiver that allows two-way communication with a user device such as a smartphone. The smart beacon may further include a network interface that allows two-way communication with a remote server (and/or other appropriate devices or systems).

A POS system of some embodiments may include a POS terminal, a network-accessible payment processing server, and a smart beacon communicatively coupled to the POS terminal. The smart beacon may also be able to communicate with the network-accessible payment processing server.

Some embodiments provide an automated method of processing a payment that includes transmitting a beacon signal from a smart beacon, identifying a consumer check-in event based on a received response to the beacon signal from a user device, retrieving charge information from a POS terminal, retrieving payment information from the user device, sending the retrieved charge information and payment information for processing at a remote processing entity, and returning a processing result such as a rejection or authorization.

The smart beacon of some embodiments may be implemented in various appropriate form factors, including, for instance, a "box" or other such housing, an insertable form (e.g., a SIM card, micro SD card, etc.), an I.D. badge (e.g., for a stadium vendor), etc. Such devices may be able to connect a single vendor to multiple customers and/or multiple payment processing resources.

The preceding Summary is intended to serve as a brief introduction to various features of some exemplary embodiments. Other embodiments may be implemented in other specific forms without departing from the scope of the disclosure.

BRIEF DESCRIPTION OF THE SEVERAL VIEWS OF THE DRAWINGS

The exemplary features of the disclosure are set forth in the appended claims. However, for purpose of explanation, several embodiments are illustrated in the following drawings.

DETAILED DESCRIPTION

Figure 1:
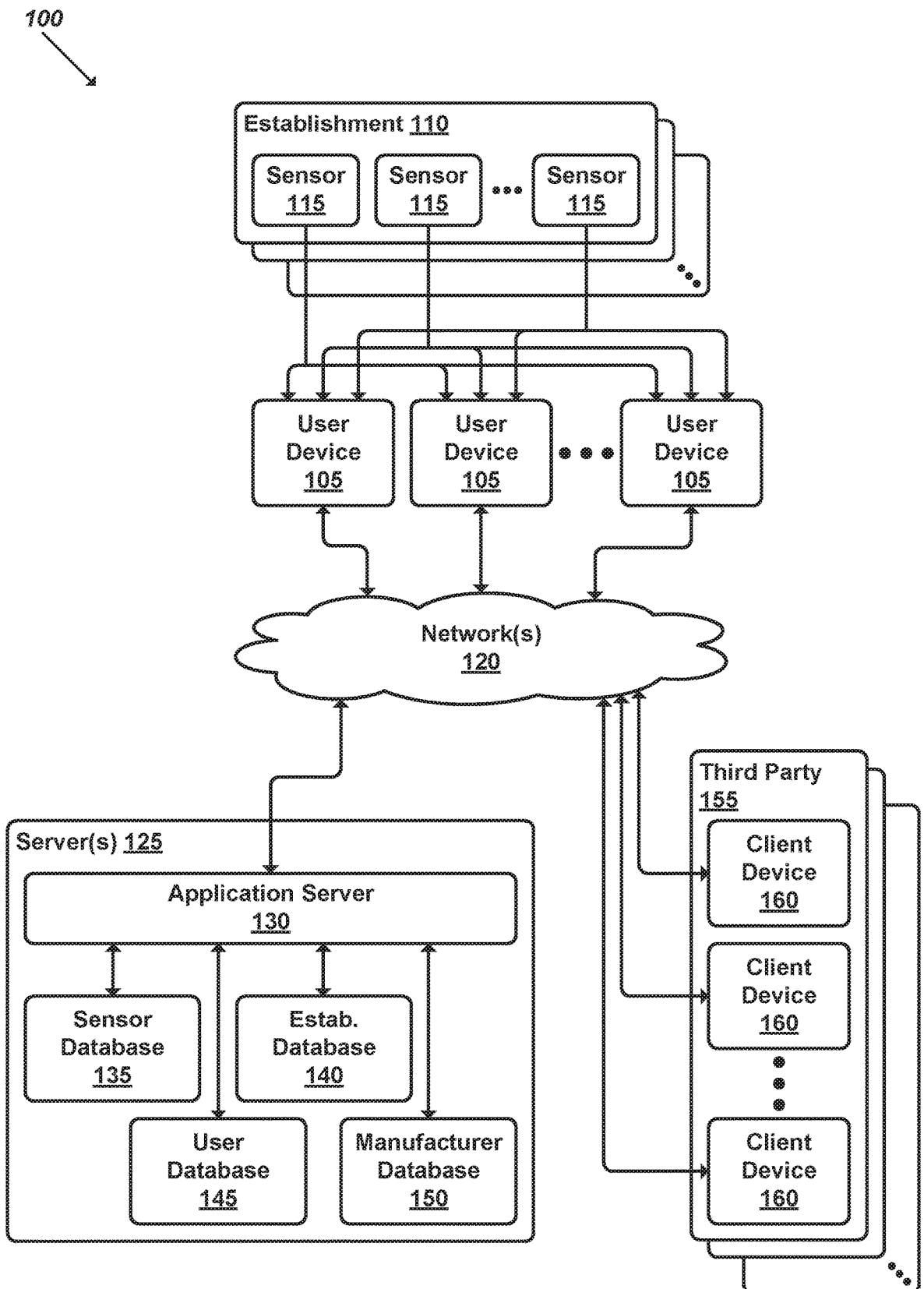
FIG. 1 illustrates a schematic block diagram of an exemplary proximity event system according to an exemplary embodiment of the invention.

The following detailed description describes currently contemplated modes of carrying out exemplary embodiments. The description is not to be taken in a limiting sense, but is made merely for the purpose of illustrating the general principles of some embodiments, as the scope of the disclosure is best defined by the appended claims.

Various features are described below that can each be used independently of one another or in combination with other features. Broadly, some embodiments generally provide a way to monitor and respond to location information. Such location information may include the location of a sensor capable of providing a beacon signal. A mobile device (and/or other appropriate device such as a fixed position locator) running an application may be able to determine whether the sensor is within a certain proximity of the device. When the application determines that the sensor is within the certain proximity of the device, the application may cause the device to communicate with a local or remote server. The server may receive information from the application (e.g., location of the device, ID of the sensor, etc.) and/or other appropriate sources (e.g., a database associated with the server). Based on such information, the server may update one or more databases associated with the sensor and/or device, send sets of instructions to the application, where the sets of instructions may cause the mobile device to perform various operations (e.g., display a message, send a message to another mobile device, etc.), and/or perform other appropriate actions (e.g., sending instructions or data to another device or system).

Some embodiments may include an apparatus and method whereby a mobile application running on a portable (or fixed location) computing device such as a smartphone or tablet can react, according to instructions provided by a remote application running on a server computer, to the proximity of a wireless sensor that transmits low-power beacon signals to announce its presence at predetermined intervals.

Some embodiments may be able to control behavior of a mobile application when a stand-alone wireless sensor comes within a proximity threshold of the portable device running the application.

Some embodiments may include a method to locate an untethered wireless sensor by its proximity to a portable computing device with more powerful location capabilities such as Global Positioning System (GPS) or a network-based locating capability. The sensor may be attached to an object, animal or person and hence its location may be unknown, but able to be determined using the portable computing device.

A smart beacon of some embodiments may allow communication among a user device, a point of sale terminal, and a transaction system. The smart beacon may act as a bridge between the user device and back office systems used to complete a transaction.

A first exemplary embodiment provides a smart beacon device comprising: a physical connector able to be coupled to a point of sale terminal and allowing two-way communication between the smart beacon and the point of sale terminal; a first wireless transceiver allowing two-way communication with a user device; and a network interface allowing two-way communication with a remote server.

A second exemplary embodiment providing a point of sale (POS) system comprising: a POS terminal; a network-accessible payment processing server; and a smart beacon communicatively coupled to the POS terminal and able to communicate with the network-accessible payment processing server.

A third exemplary embodiment provides an automated method of processing a payment, the method comprising: transmitting a beacon signal; identifying a consumer check-in event based at least partly on a received response to the beacon signal from a user device; retrieving charge information from a point of sale (POS) terminal; retrieving payment information from the user device; sending the retrieved charge information and payment information for processing at a remote processing entity; and returning a processing result comprising one of a rejection and authorization.

Several more detailed embodiments of the invention are described in the sections below. Section I provides an exemplary description of system architectures used by some embodiments. Section II then describes various exemplary software architectures used by some embodiments. Next, Section III describes various methods of operation used by some embodiments. Section IV then describes various use cases that may be implemented using some embodiments. Next, Section V describes a process used to define various applications of some embodiments. Lastly, Section VI describes a computer system which implements some of the embodiments of the invention.

I. System Architectures

FIG. 1 illustrates a schematic block diagram of an exemplary system 100 according to an exemplary embodiment of the invention. Specifically, this figure shows various communication pathways among the elements of the system 100. As shown, the system may include one or more user devices 105, one or more establishments 110, each including one or more sensors 115, one or more networks 120, one or more servers 125, the servers providing an application server 130, a sensor database 135, an establishment database 140, a user database 145, and a manufacturer database 150, and one or more third parties 155, each third party including one or more client devices 160.

Each user device (or mobile device) 105 may be capable of communicating with one or more network(s) 120 and one or more sensors 115. In addition, each user device 105 may be able to provide information to a user and/or receive inputs from a user. Each user device may include one or more processors, memory, user interface elements, and/or other appropriate elements. Such a user device may be, for instance, a mobile phone, a tablet, a portable computer, etc. Each user device may include one or more display elements (e.g., a screen, indication lights, etc.) and various user input elements (e.g., a keypad, touchscreen, etc.).

Each establishment 110 may be a retail establishment (e.g., a store, restaurant, etc.), a building (e.g., a museum, library, etc.), or some defined area (e.g., a parking lot, a sports field, etc.). Each establishment may have one or more sensors 115 placed so as to define one or more zones associated with the establishment.

Each sensor 115 may include various wireless communication features. Such wireless communication features may include radio frequency communication features and may use various appropriate formats (e.g., Bluetooth, WiFi, etc.). The sensors may be able to transmit a beacon signal that is able to be received by a user device 105. The beacon signal may include a unique sensor identifier (or "sensor ID") and may be transmitted using short-range radio frequency signals at preset intervals. The sensor 115 will be described in more detail in reference to FIGS. 4-10 below. In some embodiments, a sensor 115 may be attached to, for instance, an object, pet, person, etc.

The network(s) 120 may include one or more local-area networks (e.g., a wireless network, an Ethernet network, etc.), wide-area networks and/or networks of networks (e.g., the Internet). The networks may allow data and/or instructions to be passed among the various components of the system.

The server(s) 125 may include one or more electronic devices that are able to execute instructions and/or process data. The application server 130 may be able to pass data and/or instructions among one or more databases 135-150 and/or one or more network(s) 120. The databases 135-150 may be able to store data and/or instructions. Various example data structures will be described in reference to FIG. 16 below.

Each third party 155 may be a non-consumer individual or entity that accesses the system 100. Such entities may include, for example, retail chains, product manufacturers, application developers, etc. Each third party 155 may include one or more client devices 160 that may allow the third party 155 to access system 100 through network(s) 120. Such a client device 160 may be, for instance, a personal computer, a notebook computer, a mobile phone, etc.

During operation, a user device 105 that moves within a particular proximity of a sensor 115 may receive a beacon signal from the sensor. The user device may then execute a client-side application that allows the user device to send data and/or instructions to the server(s) 125 via the network 120. Such data and instructions may include information regarding the proximity event (e.g., an identifier of the sensor). The server(s) 125 may process the received data and/or instructions and determine various potential responses. Such responses may be based at least partly on the location of the sensor 115, an establishment 110 associated with the sensor, a third party 155 associated with the sensors, and/or other relevant factors. The server(s) 125 may determine such responses based on information stored, for instance, the sensor database 135, the establishment database 140, the user database 145, and/or the manufacturer database 150. The server(s) 125 may then send one or more responses to the user device (e.g., a coupon, sale offer, product information, etc.). The user device 105 may receive the response(s) from the server(s) and provide them to a user. Alternatively, the user device may execute various actions based on the received response(s). For instance, such actions may include making a phone call, sending a text message, playing a sound, displaying an image, determining a current position via the global positioning system (GPS) or other appropriate ways (e.g., by determining a location of a cell tower used by the user device, the location of a Femtocell, Microcell or other communications system associated with the user device, etc.), etc.

Each client device 160 may allow a third party 155 to send data and/or instructions to the server(s) 125 via the network 120. Such data and/or instructions may include sensor data, establishment data, manufacturer data, and/or other data. The server(s) 125 may process the received data and/or instructions and provide various responses (e.g. an update confirmation message, an action required message, etc.) to the third party 155 through the client device 160.

One of ordinary skill in the art will recognize that the system 100 is exemplary in nature and may be implemented in various different ways without departing from the scope of the disclosure. For instance, various elements may be removed and/or various other elements may be included. In addition, multiple elements may be combined into a single element and/or a single element may be divided into multiple elements. Furthermore, various other communication pathways may be utilized and/or included.

Figure 2:
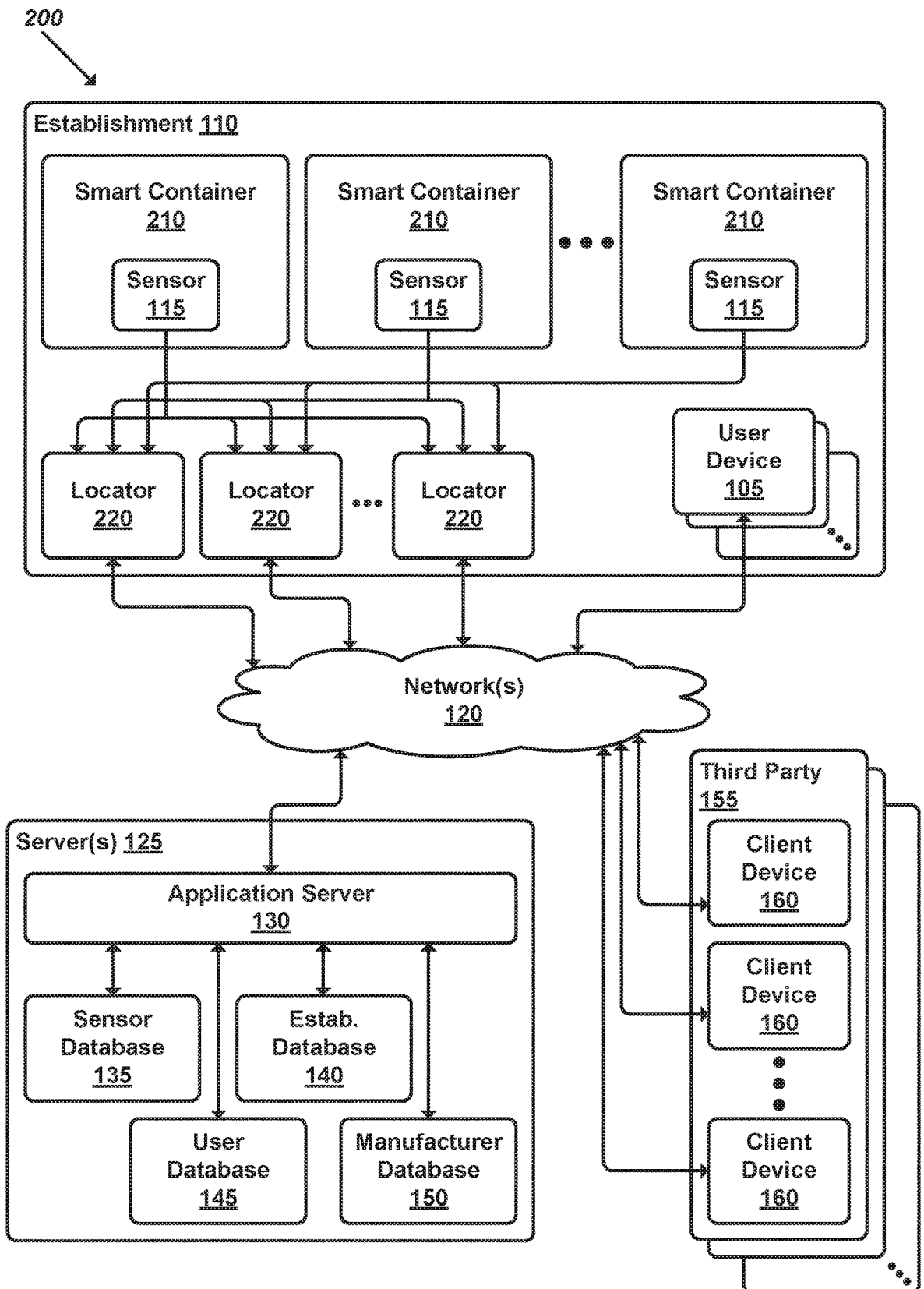
FIG. 2 illustrates a schematic block diagram of an exemplary system implemented using an alternative configuration of elements of some embodiments of the system of FIG. 1.

FIG. 2 illustrates a schematic block diagram of an exemplary system 200 implemented using an alternative configuration of elements of some embodiments of system 100. Specifically, this figure shows an implementation that may be used to monitor "tagged" items or containers within an establishment. As shown, in addition to any components described above in reference to system 100, system 200 may include a set of smart containers 210 (where each container may be associated with at least one sensor 115), a set of locators 220, and/or user devices 105.

Each smart container 210 may be a pallet, shipping container, bin, box, rack, baggage, luggage, etc. The smart container may be able to store various items or groups of items. In some cases, multiple items within a container may be tagged (e.g., a sensor may be associated with a clothing rack, while multiple other sensors may each be associated with a different hanger associated with the rack, where each hanger is associated with a clothing item, etc.). The smart container itself may include one or more sensors 115. The sensor(s) may be embedded into the container 210 or otherwise appropriately attached (e.g., using adhesives, screws or other fasteners, etc.). The sensors 115 may be removable (e.g., a sensor may be clipped onto an item during processing and removed when the item is completed). In some cases, the sensors 115 may be oriented such that, in addition to defining a location of the container 210, may be used to determine a position of the container (e.g., upright, north-facing, etc.).

Each locator 220 may be a device (e.g., a tablet, a PC, etc.) that is able to receive beacons from the sensors 115. The locator 220 may be able to communicate with an external resource (e.g., an on-site or remote server) via one or more networks (e.g., a local area network, wireless network, cellular network, etc.). In some cases, the locator may be a dedicated device that is used to track smart containers 210. As such, the locator 220 may or may not include user displays or other interactive elements, depending on the application. The locators may be placed at fixed locations that may be associated with an establishment. Such fixed locations may be associated with the locators. In this way, the locators may be used to track smart containers 210 that are associated with the establishment.

During operation, each locator 220 may collect information regarding sensors 115 that pass within a proximity threshold of the locator 220. Such information may be transmitted via network 120 to the server 125 for storage and/or analysis. The transmitted data (or elements thereof) may be made available to the third parties 155 via network 120.

In a typical scenario, a smart container 210 may enter an establishment or facility (e.g., when received from a carrier). A locator 220 near the establishment loading dock may determine that the container 210 has entered the facility when a sensor beacon signal is received. Other locators 220 may then track the container through the facility as the locators identify a sensor beacon signal associated with the container. The locators may notify a local or remote server when a sensor associated with a container 210 enters, is within, and/or leaves a proximity threshold of each locator. In this way, the server may be able to determine a location for each container 210 associated with the facility.

In addition a user device 105 may be used by an operator, manager, and/or other user, to send and/or receive information related to the establishment 110 and/or the containers 210. For instance, an operator may be able to request an estimated arrival time for a next item. As another example, a manager may be able to track inventory within various locations of the establishment 110.

The operation of system 200 will be described in more detail in reference to FIG. 25 below.

One of ordinary skill in the art will recognize that the system 200 is exemplary in nature and may be implemented in various different ways without departing from the scope of the disclosure. For instance, various elements may be removed and/or various other elements may be included. In addition, multiple elements may be combined into a single element and/or a single element may be divided into multiple elements. Furthermore, various other communication pathways may be utilized and/or included.

Figure 3:
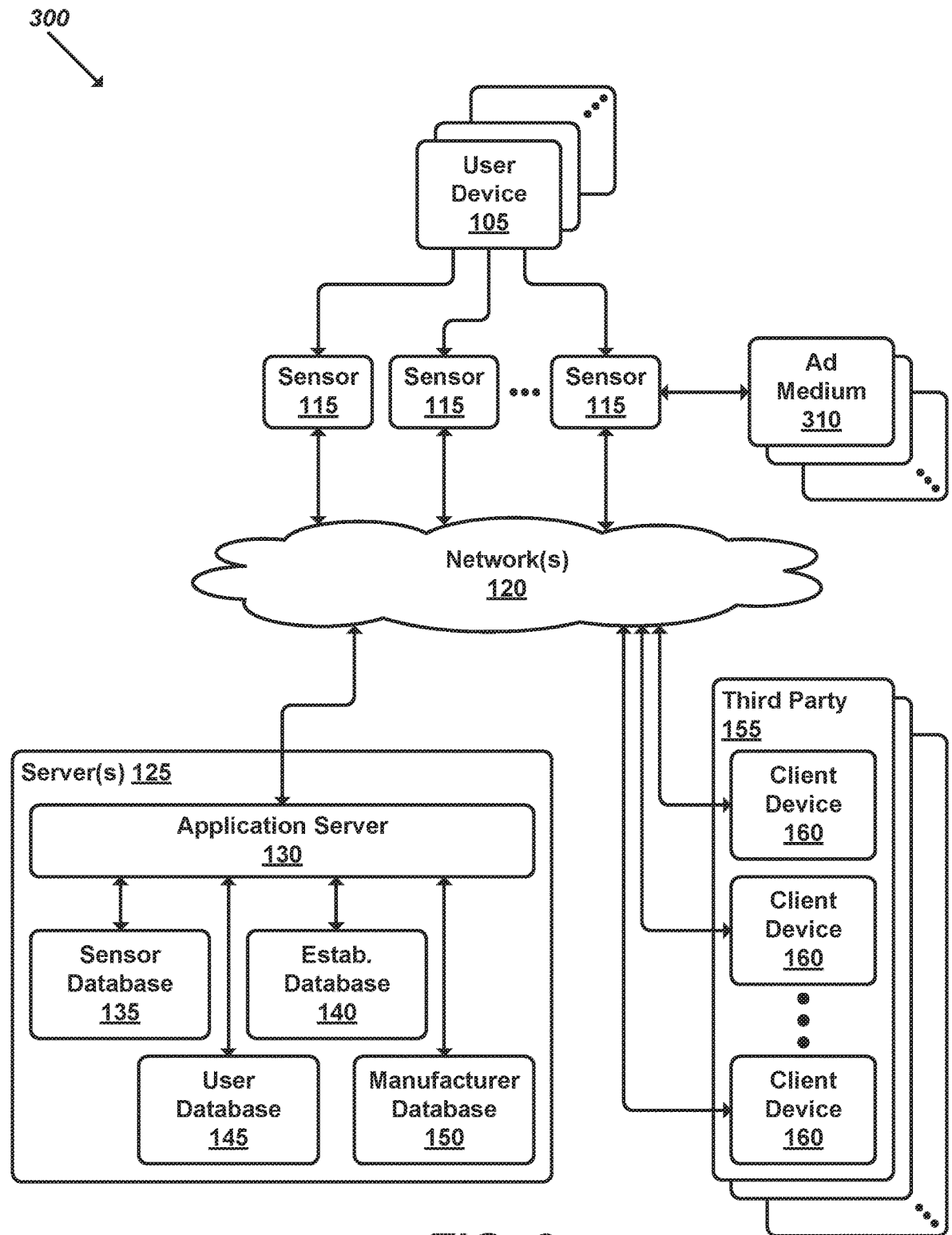
FIG. 3 illustrates a schematic block diagram of another exemplary system implemented using an alternative configuration of elements of some embodiments of the system of FIG. 1.

FIG. 3 illustrates a schematic block diagram of another exemplary system 300 implemented using an alternative configuration of elements of some embodiments of system 100. Specifically, this figure shows various communication pathways among the elements of the system 300. As shown, in addition to any components described above in reference to system 100, system 300 may include various advertising mediums 310.

During operation, each sensor 115 may collect information from user devices 105 that pass within a proximity threshold of the sensor 115. Such information may be transmitted via network 120 to the server 125 for storage and/or analysis. The transmitted data (or elements thereof) may be made available to the third parties 155 via network 120.

In addition, each sensor 115 may communicate with one or more advertising mediums 310. In some embodiments, each sensor 115 may be embedded in (or otherwise attached to) a medium 310. Each medium may be a billboard, video screen, multimedia display, and/or other appropriate devices and/or systems associated with presenting advertising content. Such communication may occur using various appropriate pathways (e.g., wired connections, wireless connections, network connections, etc.). In this way, each sensor 115 may at least partially control (and/or provide) the content present by one or more advertising mediums 310. Furthermore, as above, each sensor 115 may be able to communicate with the server 125 via one or more networks 120 in order to send and/or receive data related to the advertising content, mobile devices within a proximity threshold, and/or other appropriate information.

In some embodiments, each sensor 115 may communicate with the server 125 and, based on the sensor ID, retrieve mobile content and/or complete a transaction with a third-party advertiser associated with the advertising medium 310. In some embodiments, the medium may be able to communicate with the server 125 and/or third-party servers 155, where data sent to the medium may be based at least partly on data received from and/or associated with the sensor 115.

In some embodiments, a sensor 115 may be associated with non-interactive advertising mediums 310 (e.g., posters, product displays, etc.). The sensor 115 may be associated with non-advertising elements (not shown) such as, for example, product packaging or a product itself, artwork, etc. Such sensors may be able to collect user data and relay such data to a server 125 and/or to allow users to access information (and/or receive marketing offers) related to advertised items, displayed products, etc. Such information may be accessed using a mobile device application of some embodiments.

The operation of system 300 will be described in more detail in reference to FIGS. 20-21 below.

One of ordinary skill in the art will recognize that the system 300 is exemplary in nature and may be implemented in various different ways without departing from the scope of the disclosure. For instance, various elements may be removed and/or various other elements may be included. In addition, multiple elements may be combined into a single element and/or a single element may be divided into multiple elements. Furthermore, various other communication pathways may be utilized and/or included.

Figure 4:
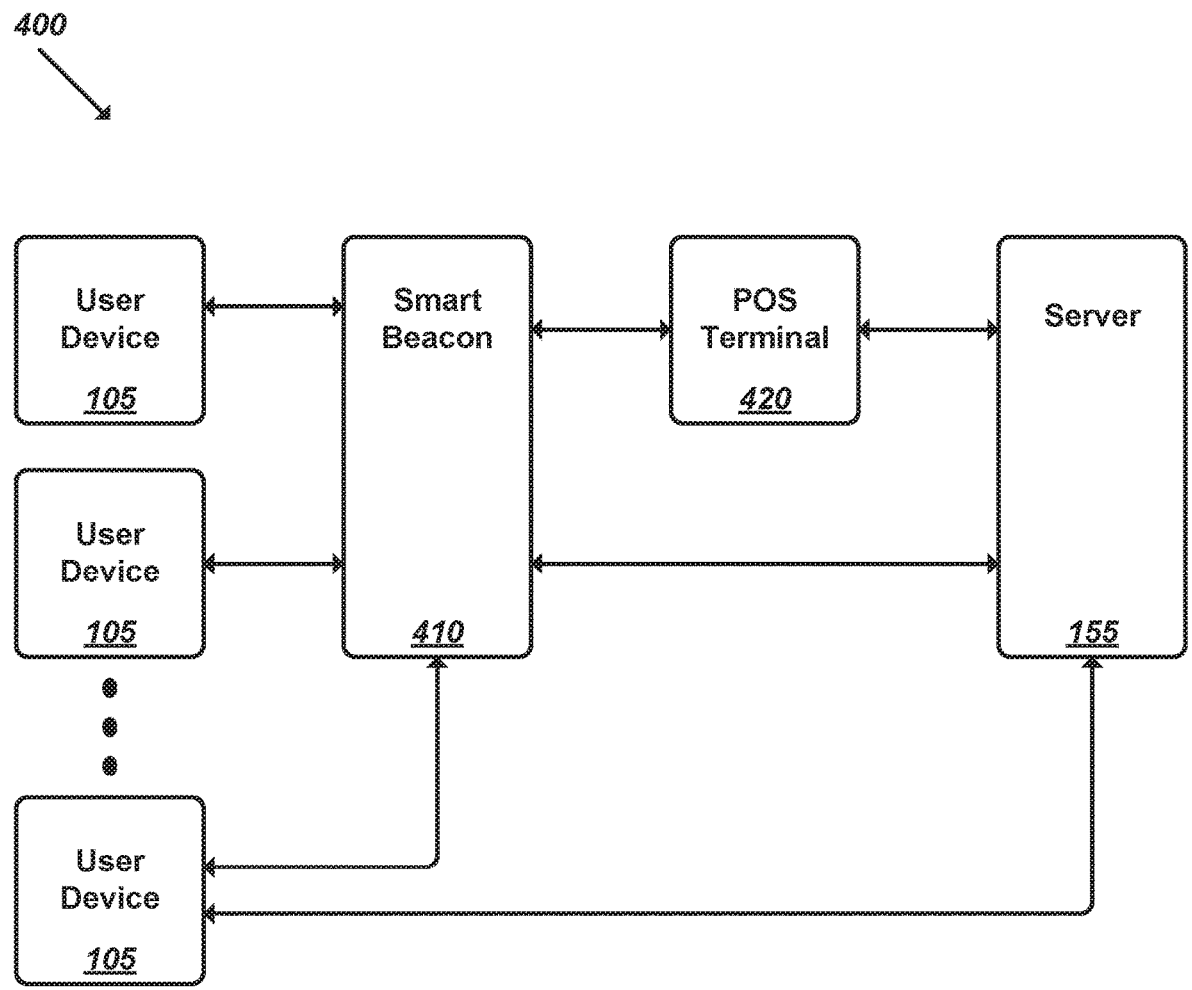
FIG. 4 illustrates a schematic block diagram of another exemplary system using a smart beacon of some embodiments.

FIG. 4 illustrates a schematic block diagram of another exemplary system 400 using a smart beacon of some embodiments. As shown, the system may include a user device 105, smart beacon 410, point of sale (POS) terminal 420, and server 155.

The user device 105 and server 155 were described above in reference to system 100. In this example, the server 155 may be associated with a transaction processing entity such as a bank, merchant office, credit card processing service, etc. The user device 105 may execute a consumer application of some embodiments.

The smart beacon 410 may be an electronic device that is able to server as a bi-directional communication path between the user device 105 and the POS terminal 420 or transactional system 155. The smart beacon 410 will be described in more detail in reference to FIG. 9 below.

The POS terminal 420 may be a device such as a register, tablet, parking system (and/or other partially mechanical systems, devices, and/or physical barriers such as a door lock, gas pump, turnstile, etc.), vending machine, etc. In some embodiments, the smart beacon 410 may at least partly control a physical relay or other actuator that may be used to manipulate various mechanical components. For instance, once payment is complete, a parking gate may be opened. As another example, a user who has paid a subway fare may be able to pass through a turnstile (and/or the fare may be automatically calculated based on an entry point and exit point for a user). The physical relay may be located remotely from the terminal 420 and/or smart beacon 410. Such that, for instance, a user may process a parking payment at a car side terminal that activates a remote relay associated with a gate when the payment authorization is given.

The user device 105 may communicate with the smart beacon 410 over a wireless channel 450 such as a Bluetooth link. The smart beacon 410 may communicate with the POS terminal 420 over a physical connection such as a USB or Ethernet connection. In some embodiments the POS terminal and smart beacon 410 may communicate over a wireless link. The terminal 420, beacon 410, and/or user device 105 may communicate with the server 155 over a TCP/IP link.

During operation, system 400 may offer various alternative scenarios. For instance, some embodiments may include a user device app that processes payments through a checking account (or other bank account), thus avoiding credit card processing fees (and/or allowing payment with different currencies). As another example, the user device may be able to emulate a credit card during a transaction using an app that is able to run across various devices and/or platforms.

One of ordinary skill in the art will recognize that the system 400 is exemplary in nature and may be implemented in various different ways without departing from the scope of the disclosure. For instance, various elements may be removed and/or various other elements may be included. In addition, multiple elements may be combined into a single element and/or a single element may be divided into multiple elements. Furthermore, various other communication pathways may be utilized and/or included.

Figure 5:
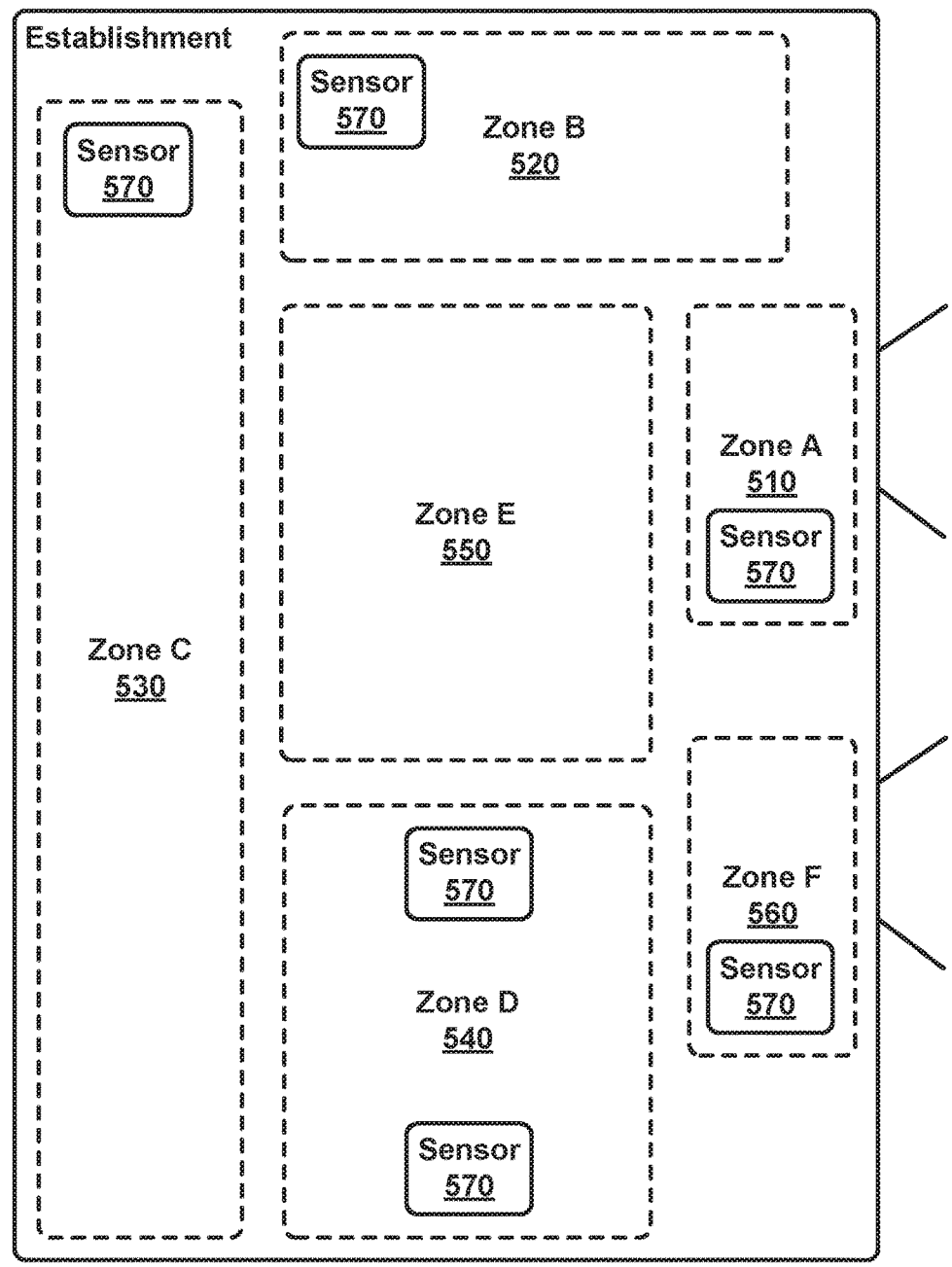
FIG. 5 illustrates a floor plan of an establishment included in some embodiments of the system of FIG. 1.

FIG. 5 illustrates a floor plan of an establishment 500 included in some embodiments of the system 100. Specifically, this figure shows how an establishment may be divided into multiple sections (or "zones") that may each use one or more sensors to identify proximity events. As shown, the establishment 500 may include multiple zones 510-560, each of which may include one or more sensors 570. The sensor location(s) may be configured in various different ways, as appropriate. Each sensor may be associated with a set of advertising mediums (not shown).

In the example of FIG. 5, a first zone 510 may be defined at an entrance of the establishment such that consumers entering the establishment 500 may trigger a proximity event. In this example, a number of product zones 520-540 may be defined such that a consumer may trigger a proximity event when a user device is able to detect the beacon signal of a sensor 570 located relative to the zone. Product zone 540 may include multiple sensors 570 such that the zone is defined as multiple sub-zones, and/or so that an array of proximity events may be determined (e.g., a user application may determine that the user is within a certain proximity of a first sensor, a second sensor, or both a first and second sensor). Zone 550 may define an "inactive" area where no proximity events are generated (e.g., an area of the establishment 500 used only by employees). Finally, zone 560 may be defined at an exit of the establishment such that consumers leaving the establishment 560 may trigger a proximity event.

During operation, a particular consumer-user may have a mobile application running on a user device. The consumer-user may then enter establishment 500 through the entrance 510, generating a proximity event. The event may cause the mobile application to send a notification of the event to a remote server, which in turn may cause the mobile application to perform an action. Such an action may include, for instance, retrieving and displaying a shopping list for the establishment, offering a generic (or user-specific) coupon, provide information regarding sale items, and/or other appropriate actions.

The consumer may then enter a first product zone 520, triggering another proximity event. In this example, the zone 520 may be a deli and the user's shopping list may indicate that the user wishes to buy a half pound of sliced ham. Thus, the proximity event may be used to provide an offer related to ham, display ham that is on sale, display other specials in the deli section, and/or other appropriate actions. The consumer-user may proceed through the establishment in a similar fashion, potentially triggering proximity events related to other zones within the establishment.

After the consumer-user has finished shopping and paid for any items, the user may leave the establishment through the exit 560, triggering a proximity event. In response to such an event, various appropriate actions may be performed, such as displaying a message on the user's mobile device (e.g., "Thank you for shopping with us!").

Proximity events may, in addition to, or in place of, interacting with a consumer or other user, cause data to be generated and stored in a way that is transparent to the user. Such data may be sent to the server and stored remotely. Alternatively, data associated with the user may be stored locally on the user's mobile device. For instance, stored data relating to proximity events may be used to calculate the average time a user spends in an establishment or zone.

One of ordinary skill in the art will recognize that the establishment 500 and associated floor plan and sensor configuration are presented for example purposes only. Different embodiments may include differently configured establishments with differently configured floor plans. In addition, the configuration (and/or number) of sensors located within each establishment may be altered as appropriate.

Figure 6:
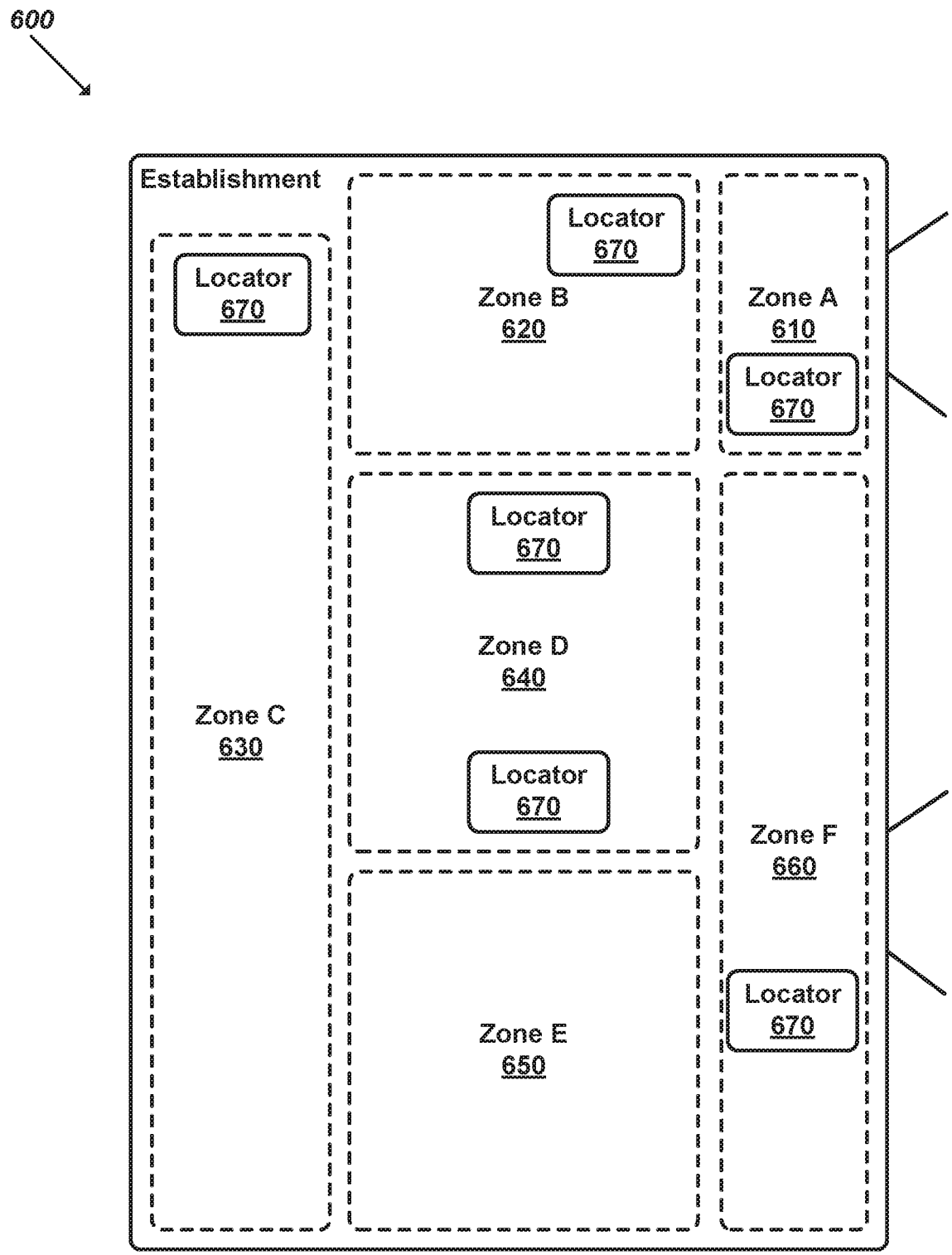
FIG. 6 illustrates a floor plan of an establishment included in some embodiments of the system of FIG. 2.

FIG. 6 illustrates a floor plan of an establishment 600 included in some embodiments of the system 200. Specifically, this figure shows how an establishment may be divided into multiple sections (or "zones") that may each use one or more locators to identify proximity events. As shown, the establishment 600 may include multiple zones 610-660, each of which may include one or more locators 670. The locators may be configured in various different ways, as appropriate.

In the example of FIG. 6, a first zone 610 may be defined at an entrance of the establishment such that smart containers (and associated sensors) entering the establishment 600 may trigger a proximity event. In this example, a number of product zones 620-640 may be defined such that a container (e.g., smart container 210 described above) may trigger a proximity event when a locator 670 is able to detect the beacon signal of a sensor within or near the zone. Product zone 640 may include multiple locators 670 such that the zone is defined as multiple sub-zones, and/or so that an array of proximity events may be determined (e.g., a user application may determine that the container is within a certain proximity of a first locator, a second locator, or both a first and second locator). Zone 650 may define an "inactive" area where no proximity events are generated (e.g., an area of the establishment 600 that does not interact with the smart containers, such as an employee lounge). Finally, zone 660 may be defined at an exit of the establishment such that containers leaving the establishment 660 may trigger a proximity event.

During operation, a particular locator may execute a client application. A container with an associated sensor may then enter establishment 600 through the loading dock 610, generating a proximity event. The event may cause the client application to send a notification of the event to a local or remote server, which in turn may update information related to the establishment 600 and/or container. Such an update may include, for instance, associating a new location with the container, updating a processing status of the container (e.g., receiving, unpacking, packing, shipping, etc.).

The container may then enter zone 620, triggering another proximity event. In this example, the zone 620 may be a processing station and the proximity event may indicate that a container is being received into inventory. Thus, the proximity event may be used to update stock data, generate a receipt confirmation for a shipper, etc.

Next, the container may enter zone 630, triggering another proximity event, and so on. The various zones may be defined using the locators 670 and information associated with the establishment 600. Each proximity event may be used to trigger an appropriate set of responses. For instance, when a box leaves a packing area and enters a shipping area, the shipping department may be notified that the box is ready to be shipped. As another example, an item under manufacture may be physically transferred from a first station to a second, thus triggering a work order to the second station.

In some cases, the locator 670 and/or an associated device (e.g., a mobile device) may alert an operator or other user that an event has taken place (e.g., an item has been transferred to the station associated with the operator, an item requires additional processing, etc.). Such an alert or other user interaction may include various elements (e.g., display elements, audio elements, etc.) and may allow (or require) a user to respond in various ways (e.g., by pressing a button, by moving an item to a next station within a specified length of time, etc.).

Alternatively and/or conjunctively, proximity events may trigger updates to data (e.g., inventory, manufacturing status, etc.) without necessarily generating any action. Data associated with the locators 670 (and/or containers) may be stored locally on the locators (and/or a local server) and/or transferred to a remote server over various appropriate networks.

One of ordinary skill in the art will recognize that the establishment 600 and associated floor plan and sensor configuration are presented for example purposes only. Different embodiments may include differently configured establishments with differently configured floor plans. In addition, the configuration (and/or number) of locators within each establishment may be altered as appropriate.

Figure 7:
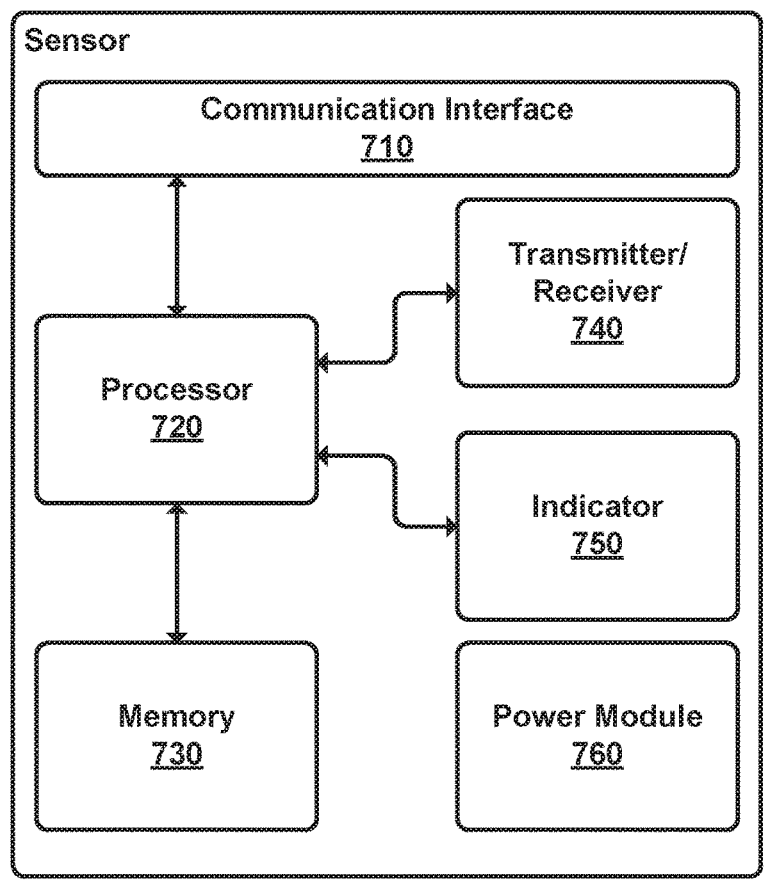
FIG. 7 illustrates a schematic block diagram of a sensor used by some embodiments of the system of FIG. 1.

FIG. 7 illustrates a schematic block diagram of a sensor 700 used by some embodiments of the system 100. Specifically, this figure shows the various components that may be included in the sensor 700 of some embodiments. As shown, the sensor device 700 may include a communication interface 710, a processor 720, a memory 730, a transmitter/receiver 740, one or more indicators 750, and/or a power module 770.

The communication interface 710 may be able to allow a client device (e.g., a PC, a smart phone, etc.) to communicate with the sensor 700 (or vice-versa). The communication interface 710 may include various wired and/or wireless connections (e.g., a universal serial bus (USB) port, a Bluetooth or other wireless port, etc.).

The communication interface may be able to allow two-way communication among the sensor and various other devices and/or connections (e.g., between the sensor and a mobile device via a Bluetooth connection, between the sensor and a server across a network or set of networks, between a first sensor and a second sensor, etc.).

The communication interface may be able to allow users to adjust settings of the sensor (e.g., beacon signal range, direction, interval time, etc.). In some embodiments, the sensor 700 may be configured when manufactured. In some of these embodiments, the sensor may be configured to run firmware. Such firmware may allow the sensor to continuously operate when power is provided. The firmware may be able to cause the sensor continuously or periodically perform various operations (e.g., transmit a beacon signal, react to events, etc.). The sensor attributes may then be configured at the server (e.g., range and spread of the beacon signal, pattern of the signal, definition of events and responses, etc.). Alternatively, various configuration parameters may be defined and/or updated as the sensor operates.

The processor 720 may be able to process instructions and/or data. In addition, the processor may be able to allow communication among the various other modules of the sensor 700.

The memory 730 may be able to store various instructions and/or data used by the sensor 700. Such instruction may include firmware instructions, logical operations, and/or other appropriate instructions. The data may include, for instance, an identifier of the sensor, attributes of the sensor performance (e.g., range and spread of the beacon signal, interval between signals, etc.), and/or other information.

The transmitter/receiver 740 may be able to transmit various types of beacon signals (e.g., WiFi, Bluetooth (classic, low energy (LE) (e.g., "Bluetooth Smart Ready", "Bluetooth Smart", etc.), Bluetooth v4.0, etc.), etc.) using various different communications protocols (e.g., cellular (e.g., 2G, 3G, 4G LTE, etc.), ZigBee protocol, ANT, ANT+, etc.). The transmitter may be configurable, such that the range and spread of the transmitted signal(s) may be controlled (e.g., by loading values to the sensor memory 730, by defining various attributes at the server, etc.).

In some embodiments, the range, spread, and/or other attributes of the beacon signal may be adjusted at run-time by a client application (e.g., by adjusting a threshold received power used to trigger an event). Such "dynamic range" may be used to allow various sellers (e.g., manufacturers of particular brands) to bid for placement in real-time. For instance, multiple brands of a particular product may be perceived as each being the same distance (or matched to within a particular threshold) from a consumer. In some cases, an order of the items presented may correspond at least partly to various bid amounts associated with sellers of the products (rather than being determined solely based on proximity).

In addition, the transmitter/receiver 740 of some embodiments may be able to receive various types of signals and/or communications. The receiver may communicate with other devices via similar protocols to those used by the transmitter. In some embodiments, one or more transmitters and/or one or more receivers may share elements of the sensor (e.g., an antenna, communication circuitry, etc.). The operation of the receiver (and/or transmitter) may be configurable in some embodiments (e.g., Bluetooth communications may be able to be enabled/disabled, communication power and/or frequency may be adjusted, etc.).

Some embodiments may include multiple transmitter/receivers 740 (and/or multiple transmitters and/or receivers). Each transmitter/receiver may be associated with a particular external element or elements (e.g., user devices, a remote server, an advertising medium, etc.).

The indicator(s) 750 may be able to provide a visual indication of the status of the sensor. The indicator(s) may include various display elements (e.g., differently-colored lights, a set of LEDs, etc.). The indicator(s) may allow a user to determine a current state of the sensor (e.g., "off", "on", "transmitting", "error", etc.). In some embodiments, the indicator(s) may provide other than visual indications (e.g., one or more sound indicators, message(s) delivered to a client device, etc.).

In some embodiments, the sensor 700 may include a detection module that may allow the sensor to determine when a user device is within a threshold distance of the sensor. Such detection may be based at least partly on received signal strength (e.g., a Bluetooth signal, cellular signal, etc.), data received from a remote server, and/or other appropriate parameters.

In some embodiments, the sensor 700 may be able to detect environmental conditions (e.g., temperature, speed, magnetic field, brightness, etc.) using various appropriate elements (e.g., light sensors, Hall Effect sensors, accelerometers, etc.). In this way, beacon transmissions may be triggered based on various environmental factors. For example, the sensor may transmit when light is sensed (e.g., when the sensor is removed from a box). As another example, employees may be tracked within a venue to determine time and attendance, where a tag including a sensor is sensed as attached to an employee based on temperature.

One of ordinary skill in the art will recognize that the sensor 700 is exemplary in nature and may be implemented in various different ways without departing from the scope of the disclosure. For instance, various elements may be removed and/or various other elements may be included. In addition, multiple elements may be combined into a single element and/or a single element may be divided into multiple elements. Furthermore, various other communication pathways may be utilized and/or included.

Figure 8:
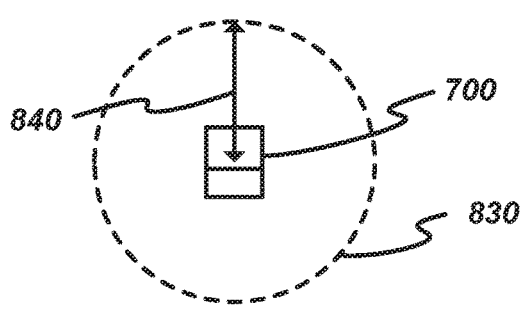
FIG. 8 illustrates top views of the sensor of FIG. 7, showing proximity zones defined by various beacon signals that may be provided by some embodiments of the sensor.
Figure 8:
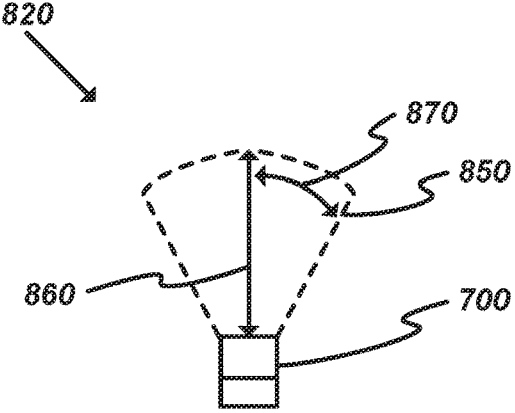

FIG. 8 illustrates top views 810-820 of the sensor 700, showing proximity zones defined by various beacon signals that may be provided by some embodiments of the sensor 700. Specifically, this figure illustrates several example areas that may be defined by setting various beacon signal attributes (e.g., range, direction, and/or spread). As shown, in a first configuration 810, the signal area 830 is omni-directional and the signal range is defined by radius 840. In a second configuration 820, the signal area 850 is defined by a range 860 and spread angle 870.

In some embodiments, the primary direction of the signal (i.e., the signal direction with a minimum spread angle) in the second configuration 820 may be selectable (e.g., the primary direction may be a defined value, such as an angle, relative to various physical attributes of the sensor 700). In some other embodiments, the primary direction of the signal in the second configuration may be pre-set in relation to physical attributes of the sensor (e.g., the sensor may be able to mount to a wall and the primary direction of the signal may be set to emanate in a direction perpendicular to and away from the wall).

The shape, direction, range, and/or other attributes of the beacon signal may be defined in various different ways to achieve various different optimizations. For instance, in some embodiments a user of the sensor 700 may wish to generate a signal area that covers the most possible physical space. Such a user may select an omni-directional signal with a maximum range allowed by the sensor. As another example, a user of the sensor may wish to minimize power used by the sensor and thus may define a signal area with limited range and spread.

One of ordinary skill in the art will recognize that the signal areas 830 and 850 are exemplary in nature and may be implemented in various different ways without departing from the scope of the disclosure. For instance, the areas may be defined by various different shapes with various specific attributes.

Figure 9:
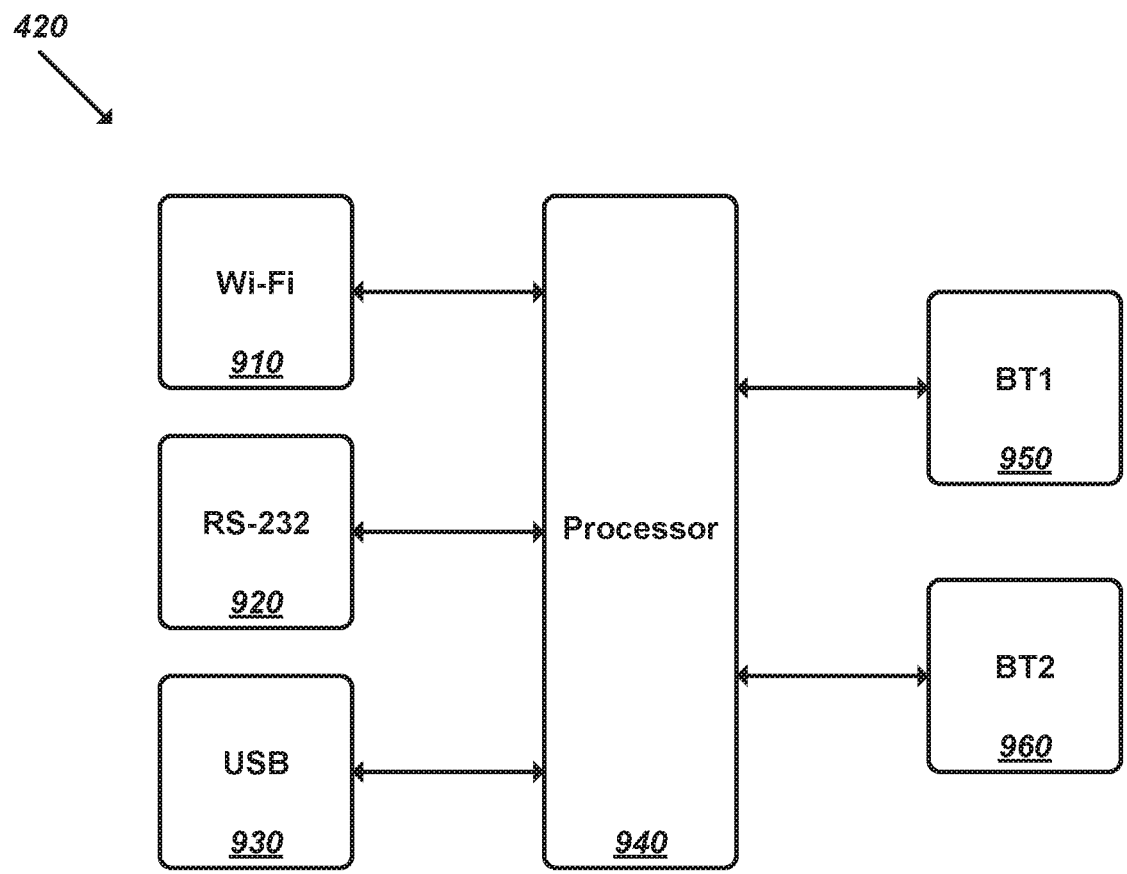
FIG. 9 illustrates a schematic block diagram of smart beacon used by some embodiments of the system of FIG. 4.

FIG. 9 illustrates a schematic block diagram of smart beacon 420 used by some embodiments of the system 400. As shown, the smart beacon 420 may include a Wi-Fi module 910, an RS-232 communication module 920, a USB interface module 930, a processor 940, a first Bluetooth module 950, and a second Bluetooth module 960. Such a beacon may be implemented in various appropriate form factors, including, for instance, a "box" or other such housing, an insertable form (e.g., a SIM card, micro SD card, etc.), an I.D. badge (e.g., for a stadium vendor), etc. Such devices may be able to connect a single vendor to multiple customers.

The Wi-Fi module 910, RS-232 module 920, and USB interface 930 may allow the device 420 to communicate across various networks, interact with various POS devices, and/or communicate with various processing servers.

The USB interface 930 may include a configuration and diagnosis interface exposed as a COM port over a USB connector and may be accessed by any applicable operating system via a terminal emulator application. The USB interface 930 may further include a full-speed peripheral interface that allows connection of the device 420 to various hosts such as POS terminals, computers, etc. The interface 930 may support USB communication device class interface and thus eliminate the need for any special driver.

Devices 420 with multiple Bluetooth transceivers 950-960 may allow pass-through communications between various peripherals and/or servers. For instance, the dual transceivers may allow, for example, pass-through between two or more servers, range extension (e.g., by daisy-chaining), pass-through between two or more clients.

Per Bluetooth Low Energy (BLE) specifications, peripheral devices may only support one active connection with a master. A BLE master may have more than one active connection with multiple peripherals. BLE master devices like smartphones, tablets, computers can communicate to other BLE master devices through the pass-through mode supported by mBeaconPay, this broaden the number of use cases possible, as the BLE specification doesn't allow master to master communications and that limits some communication scenarios.

To establish a pass-through communication one client may establish a connection with BT1 950 (named mPOS) and another client may connect with BT2 960 (named mClient).

The processor 940 may be able to execute instructions, manipulate data, direct other components, and/or evaluate received commands.

The Bluetooth modules 950-960 may be able to wirelessly (and/or otherwise) communicate with one or more user devices, POS terminals, and/or other appropriate elements.

Variants of device 420 may include, for instance, a dual radio architecture including one Wi-Fi transceiver 910 and one Bluetooth transceiver 950 interconnected by processor 940. Another exemplary variant may include one Wi-Fi transceiver 910 and two Bluetooth transceivers 950-960 interconnected by processor 940. Such an embodiment may further include an additional RS-232 interface 910 allowing connection to a cellular modem and offering a four radio module with a variety of connection option. A third exemplary variant may include a dual radio architecture with a multi-drop bus interface to communicate with, for instance, a vending machine controller and thus enable proximity payment solutions for unattended vending systems (e.g., vending machines, gas pumps, ticketing systems, parking systems, etc.).

One of ordinary skill in the art will recognize that the smart beacon 420 is exemplary in nature and may be implemented in various different ways without departing from the scope of the disclosure. For instance, various elements may be removed and/or various other elements may be included. In addition, multiple elements may be combined into a single element and/or a single element may be divided into multiple elements. Furthermore, various other communication pathways may be utilized and/or included.

Figure 10:
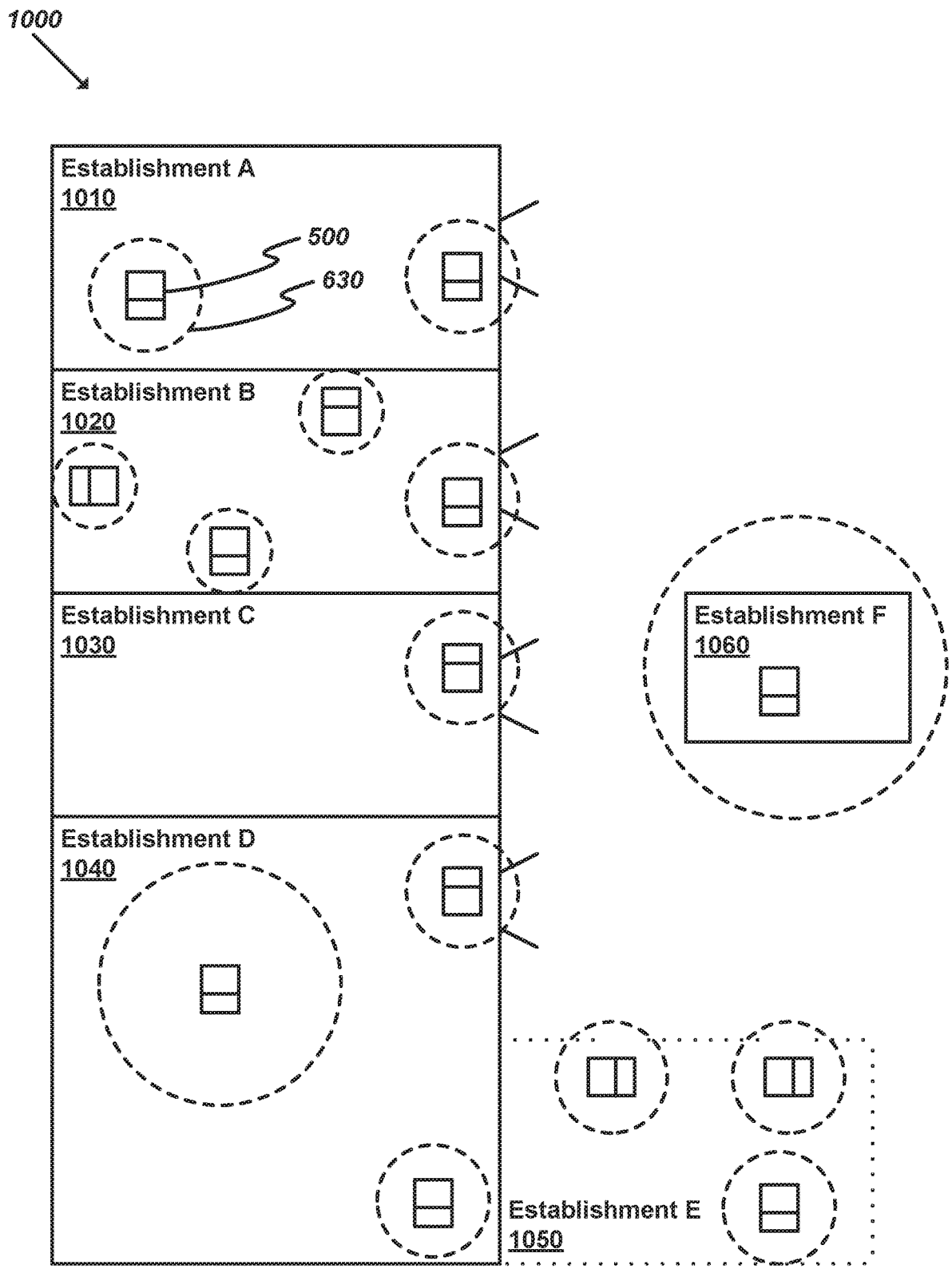
FIG. 10 illustrates a floor plan of a multi-sensor, multi-establishment implementation according to some embodiments of the system of FIG. 1.

FIG. 10 illustrates a floor plan of a multi-sensor, multi-establishment implementation 1000 according to some embodiments of the system 100. Specifically, this figure illustrates multiple sensors 700, each configured to provide an omni-directional beacon signal area 830, positioned at example locations throughout the implementation 1000.

As shown, the multi-sensor implementation 1000 may include one or more establishments 1010-1060, each establishment including one or more sensors 700. One of ordinary skill in the art would recognize that one or more establishments may not include any sensors (not shown in this example). In addition, one of ordinary skill in the art would recognize that various ranges, directions, and spread of signals may be used, as described above in reference to FIG. 8.

In the example of FIG. 10, a first establishment 1010 may include a sensor 700 located near an entrance and another sensor 700 located within the establishment 1010. A second establishment 1020 may include multiple sensors 700 placed at various locations throughout the establishment 1020. A third establishment 1030 may have only one sensor 700 located in the establishment 1030. A fourth location 1040 may include multiple sensors 700, where one sensor is configured to have a much greater beacon signal range 830 than the other sensors 700. A fifth establishment 1050 may include multiple entryways/exitways, each associated with a sensor 400, and another sensor located within the establishment 1050. In this example, the fifth establishment 1050 may be an open area (e.g., a section of a parking area, field, etc.) and/or be at least partly defined by a temporary structure (e.g., a cover, tent, set of display tables, etc.). A sixth establishment 1060 may be an outdoor booth or cart with a single sensor 700 that defines an area that includes locations outside the boundaries of the booth or cart.

One of ordinary skill in the art will recognize that schematic diagram of a multi-sensor configuration 1000 is exemplary in nature and may be implemented in various different ways without departing from the scope of the disclosure. For instance, different establishments or groups of establishments may have different shapes, floor plans, etc.

II. Software Architectures

Figure 11:
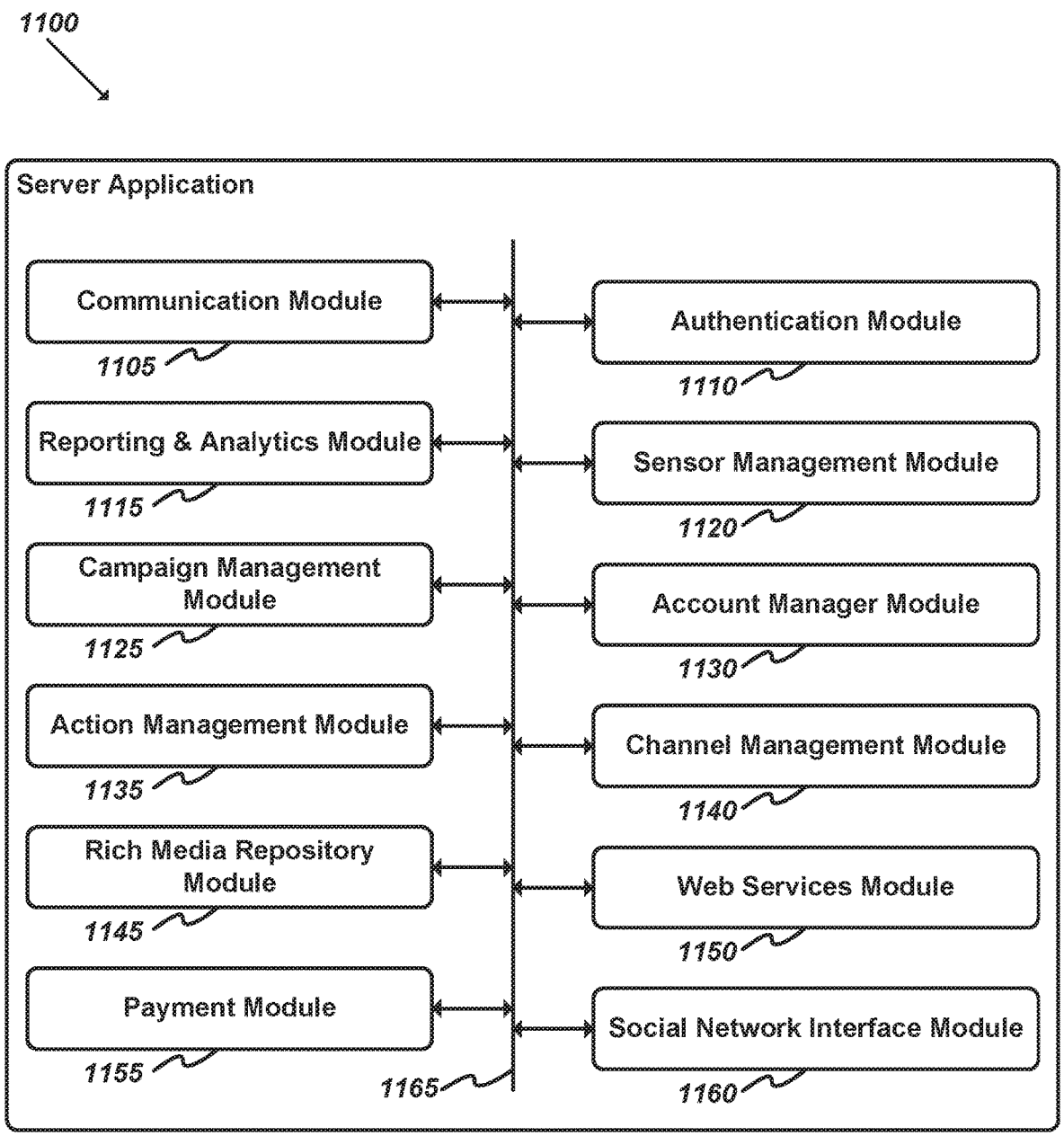
FIG. 11 illustrates a schematic block diagram of an exemplary server application provided by some embodiments of the invention.

FIG. 11 illustrates a schematic block diagram of an exemplary server application 1100 provided by some embodiments of the invention. Specifically, this figure shows various system components that may be provided by the server (or server-side) application. Such a server-side application may be executed by one or more appropriate user devices. As shown, the server application may include a communication module 1105, an authentication module 1110, a reporting & analytics module 1115, a sensor management module 1120, a campaign management module 1125, an account manager module 1130, an action management module 1135, a channel management module 1140, a rich media repository module 1145, a web services module 1150, a payment module 1155, a social network interface module 1160, and/or a communications bus 1165.

The communication module 1105 may be able to communicate with various client devices, typically across one or more networks. The authentication module 1110 may be able to confirm and/or validate user account information (e.g., a login name and password) supplied by a user (e.g., a consumer, an establishment-user, a manufacturer-user, etc.). The reporting and analytics module 1115 may be able to perform various analyses and reporting of collected data. Such a module may be used to generate reports, produce charts and/or export data that can be analyzed by and/or integrated into third-party systems. The sensor management module 1120 may be able to control and manage the sensors used by some embodiments (e.g., by defining events, ranges, etc.).

In some embodiments, the reporting and analytics module 1115 may be able to collect data from various sources. Such data may be collected from, for instance, user devices, sensors, third-party servers, etc. The data may include marketing information, user activity information, sales information, order information, and/or other appropriate data that may be useful in association with proximity events.

The campaign management module 1125 may be able to allow management of marketing campaigns. The account manager module 1130 may be able to allow management of various accounts (e.g., consumer-user, establishment-user, manufacturer-user, etc.). The action management module 1135 may be able to create, configure and associate events with corresponding sensors. The channel management module 1140 may be able to customize advertisements, marketing messages and application events based on a device's capabilities and methods of connection. The rich media repository module 1145 may be able to provide and store rich media resources. The web services module 1150 may be able to configure the user/client information and settings via various webpages.

The payment module 1155 may be able to process invoice, billing, and/or payment information in various appropriate ways. Such a module may be able to generate (or receive from another source) a list of goods and/or services associated with a consumer and generate an invoice (or other appropriate way of requesting a payment from the consumer). The module may further receive payment information from a consumer (e.g., via a credit card swiping element, by providing an entry form, by receiving the information from an application associated with the consumer, etc.). In addition, the module may communicate with various external resources to verify the payment information and authorize payment (e.g., by sending a request to a third party to process a credit card transaction, receiving confirmation back from a third party, etc.).

The social network interface module 1160 may be able to interact with various third-party social networks. Such networks may be accessed through various combinations of networks (e.g., the Internet), interfaces (e.g., one or more APIs), and/or other elements. Such a social network interface may, for instance, allow a user to recommend (and/or receive recommendations regarding) an establishment, item, service, etc. to various other users that may be associated with a social network account of the user.

The bus 1165 may be able to allow communication among the various other elements 1105-1160 of the server application 1100.

The operation of the server application 1100 will be described in more detail in reference to Section III below.

One of ordinary skill in the art will recognize that the server application 1100 is exemplary in nature and may be implemented in various different ways without departing from the scope of the disclosure. For instance, various elements may be removed and/or various other elements may be included. In addition, multiple elements may be combined into a single element and/or a single element may be divided into multiple elements. Furthermore, various other communication pathways may be utilized and/or included.

Figure 12:
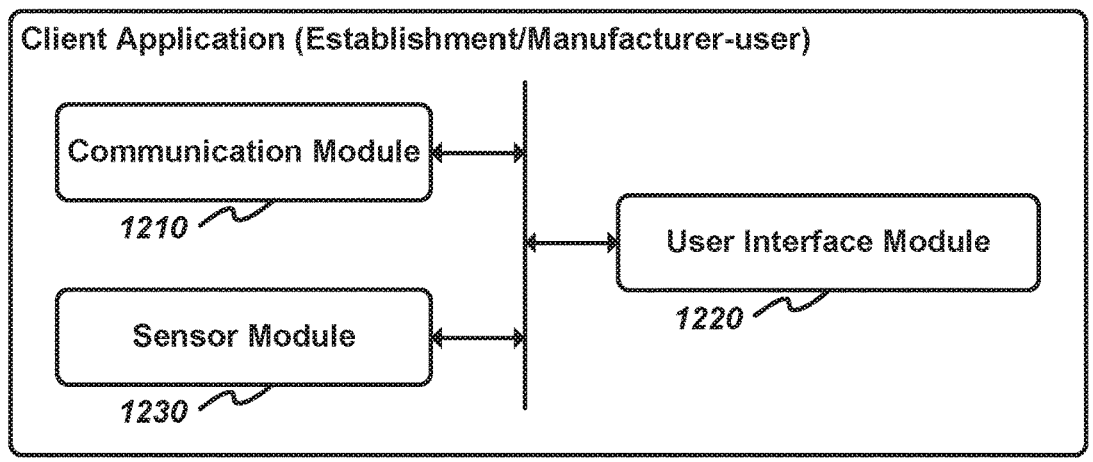
FIG. 12 illustrates a schematic block diagram of an exemplary user application provided by some embodiments of the invention.

FIG. 12 illustrates a schematic block diagram of an exemplary user application 1200 provided by some embodiments of the invention. Specifically, this figure shows various system components that may be provided by the client (or client-side) application. Such a client-side application may be executed by an appropriate user device. As shown, the application may include a communication module 1210, a user interface module 1220, and/or a sensor module 1230.

The communication module 1210 may be able to communicate with various server devices, typically across one or more networks. In addition, the communication module may be able to communicate with one or more sensors of some embodiments (e.g., via a WiFi channel, a Bluetooth link, etc.). The communication module may also be able to communicate with one or more advertising mediums, and/or other external devices and/or systems.

The user interface module 1220 may be able to provide outputs to a user and/or receive inputs from the user. The sensor module 1230 may be able to configure, test, communicate with, and/or otherwise interact with one or more sensors of some embodiments.

One of ordinary skill in the art will recognize that the establishment-user and/or manufacturer-user application 1200 is exemplary in nature and may be implemented in various different ways without departing from the scope of the disclosure. For instance, various elements may be removed and/or various other elements may be included. In addition, multiple elements may be combined into a single element and/or a single element may be divided into multiple elements. Furthermore, various other communication pathways may be utilized and/or included.

Figure 13:
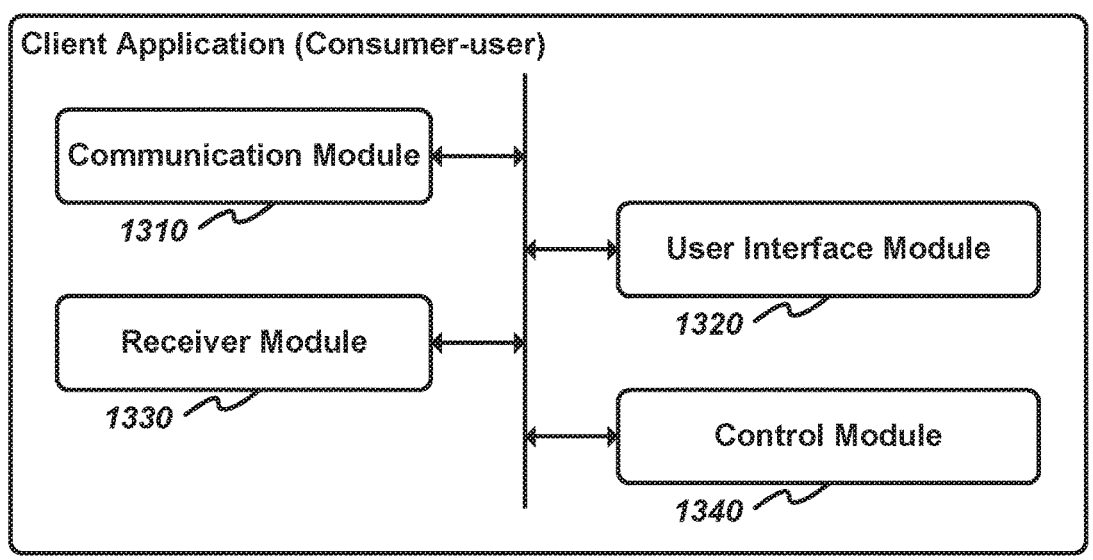
FIG. 13 illustrates a schematic block diagram of an alternative exemplary user application provided by some embodiments of the invention.

FIG. 13 illustrates a schematic block diagram of an alternative exemplary user application 1300 provided by some embodiments of the invention. Specifically, this figure shows various system components that may be provided by the client (or client-side) application. Such an application may be executed by an appropriate user device (e.g., a smart phone, a tablet, etc.) and may use various resources provided by the user device (e.g., network connections, storages, GPS, etc.). As shown, the application may include a communication module 1310, a user interface module 1320, a receiver module 1330, and/or a control module 1340.

The communication module 1310 may be able to communicate with various server devices, typically across one or more networks. In addition, the communication module may be able to communicate with one or more sensors of some embodiments (e.g., via a WiFi channel, a Bluetooth link, etc.). The communication module may also be able to communicate with one or more advertising mediums, and/or other external devices and/or systems.

The user interface module 1320 may be able to provide outputs to a user and/or receive inputs from the user. The receiver module 1330 may be able to receive beacon signals from the sensors of some embodiments. The control module 1340 may be able to control various aspects of a user device (e.g., by causing the device to display a GUI, to send a text message, to place a phone call, to play a sound, etc.).

One of ordinary skill in the art will recognize that the consumer-user application 1300 is exemplary in nature and may be implemented in various different ways without departing from the scope of the disclosure. For instance, various elements may be removed and/or various other elements may be included. In addition, multiple elements may be combined into a single element and/or a single element may be divided into multiple elements. Furthermore, various other communication pathways may be utilized and/or included.

Figure 14:
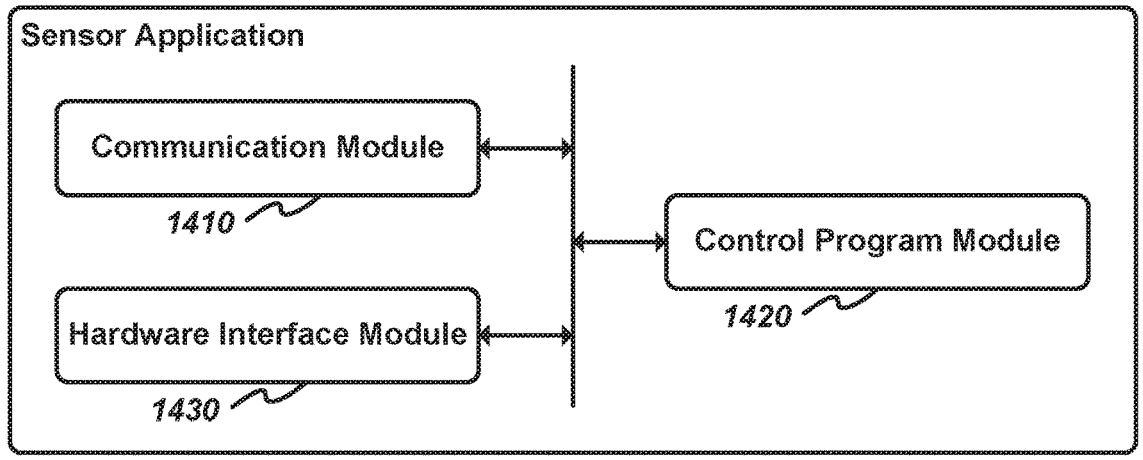
FIG. 14 illustrates a schematic block diagram of a sensor application provided by some embodiments.

FIG. 14 illustrates a schematic block diagram of a sensor application 1400 provided by some embodiments of the invention. Specifically, this figure shows various system components that may be provided by the sensor application. The combination of sensor software and memory described above in reference to FIG. 7 may provide a firmware solution for controlling the operation of a sensor. Such an application 1400 may be executed by an appropriate sensor device (e.g., sensor 700) and may use various resources provided by the sensor device (e.g., a transmitter, memory, etc.). As shown, the application may include a communication module 1410, a control program module 1420, and/or a hardware interface module 1430.

The communication module 1410 may be able to communicate with various other devices (e.g., user devices, server devices, advertising mediums, etc.) via one or more pathways (e.g., Bluetooth channels, WiFi networks, the Internet, etc.). The control program module 1420 may be able to implement various pre-programmed operations of the sensor, where such operations may be re-programmed in some embodiments (e.g., via the server, via a mobile device, etc.). The hardware interface module 1430 may be able to control and/or communicate with various elements of the sensor device (e.g., a transmitter, receiver, indicators, etc.).

One of ordinary skill in the art will recognize that the sensor application 1400 is exemplary in nature and may be implemented in various different ways without departing from the scope of the disclosure. For instance, various elements may be removed and/or various other elements may be included. In addition, multiple elements may be combined into a single element and/or a single element may be divided into multiple elements. Furthermore, various other communication pathways may be utilized and/or included.

Figure 15:
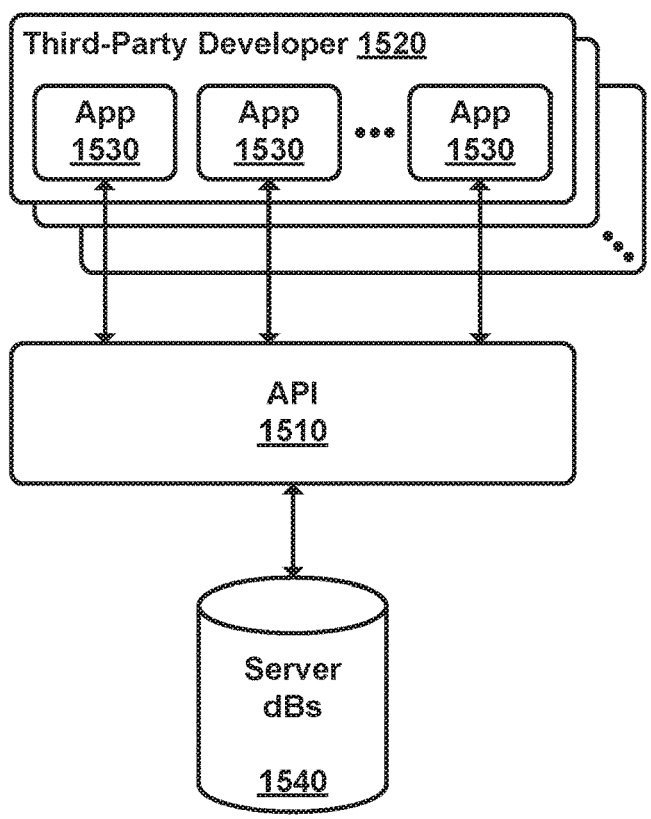
FIG. 15 illustrates a schematic block diagram of a system including an application interface provided by some embodiments of the invention.

FIG. 15 illustrates a schematic block diagram of a system 1500 including an application interface 1510 provided by some embodiments of the invention. Specifically, this figure shows various system components that may be provided to third-party application developers in some embodiments. As shown, the system may include the interface 1510, one or more third-party developers 1520, one or more applications 1530, and one or more server databases 1540.

The interface 1510 may allow third-party application developers 1520 to develop various third-party applications 1530 that may be able to access the server databases 1540 through the interface 1510.

The interface 1510 may include, for example, a representational state transfer ("REST") interface (and/or other appropriate interfaces) that may allow third-party developers to utilize http commands to access the server databases 1520. In addition, third-party developers may be able to reconfigure sensor operation using the interface 1510 to manipulate sensor data stored on the databases 1520. Such sensor operation may be at least partially controlled via parameters such as beacon strength and/or direction, data associated with advertising content for some advertising medium, etc.

One of ordinary skill in the art will recognize that the system 1500 is exemplary in nature and may be implemented in various different ways without departing from the scope of the disclosure. For instance, various elements may be removed and/or various other elements may be included. In addition, multiple elements may be combined into a single element and/or a single element may be divided into multiple elements. Furthermore, various other communication pathways may be utilized and/or included.

Figure 16:
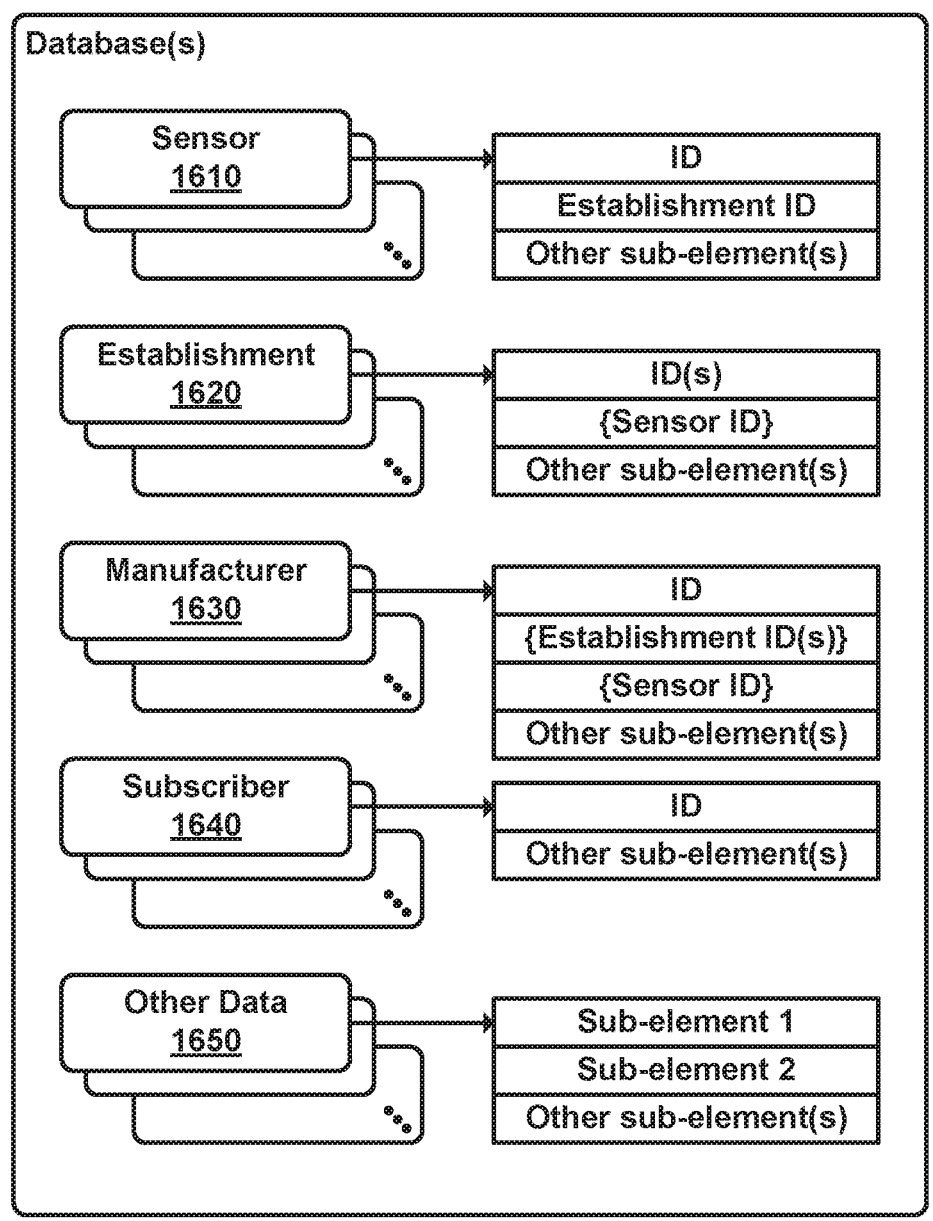
FIG. 16 illustrates a block diagram of a database including various exemplary data structures used by some embodiments of the invention.

FIG. 16 illustrates a block diagram of a database 1600 including various exemplary data structures or elements 1610-1640 used by some embodiments of the invention. Specifically, this figure shows various data elements that may be utilized by some embodiments of the invention. As shown, the database 1600 of some embodiments may include one or more sensor data elements 1610, one or more establishment data elements 1620, one or more manufacturer data elements 1630, one or more subscriber data elements 1640, and/or one or more other data elements 1650.

Each sensor data element 1610 may include an ID, an establishment ID, and/or other sub-elements (e.g., events associated with the sensor). Each establishment data element 1620 may include one or more IDs (each ID may correspond to a particular location of the establishment, such as one establishment among a retail chain or a zone within a single establishment), a set of associated sensor IDs, and/or other sub-elements (e.g., menu tables, order tables, shopping carts, etc.). Each manufacturer data element 1630 may include an ID, a set of establishment IDs (each associated establishment may correspond to a particular establishment and/or location), a set of sensor IDs, and/or other sub-elements (e.g., brands associated with the manufacturer, special offers associated with the manufacturer, etc.). Each subscriber (or consumer) data element 1640 may include an ID and/or other sub-elements (e.g., a username, password, and/or other sub-elements such as attributes and/or history related to the subscriber). Each other data element 1650 may include one or more sub-elements, where each sub-element may include some data item related to the data element.

One of ordinary skill in the art will recognize that the data structures of FIG. 16 are exemplary in nature and may be implemented in various different ways without departing from the scope of the disclosure. For instance, although the database is represented as a single entity, it may in fact be implemented using multiple physical systems distributed among various locations. As another example, various groups of data elements may be combined to form tables of data. As yet another example, various sub-elements may be associated with multiple data elements, as appropriate.

Figure 17:
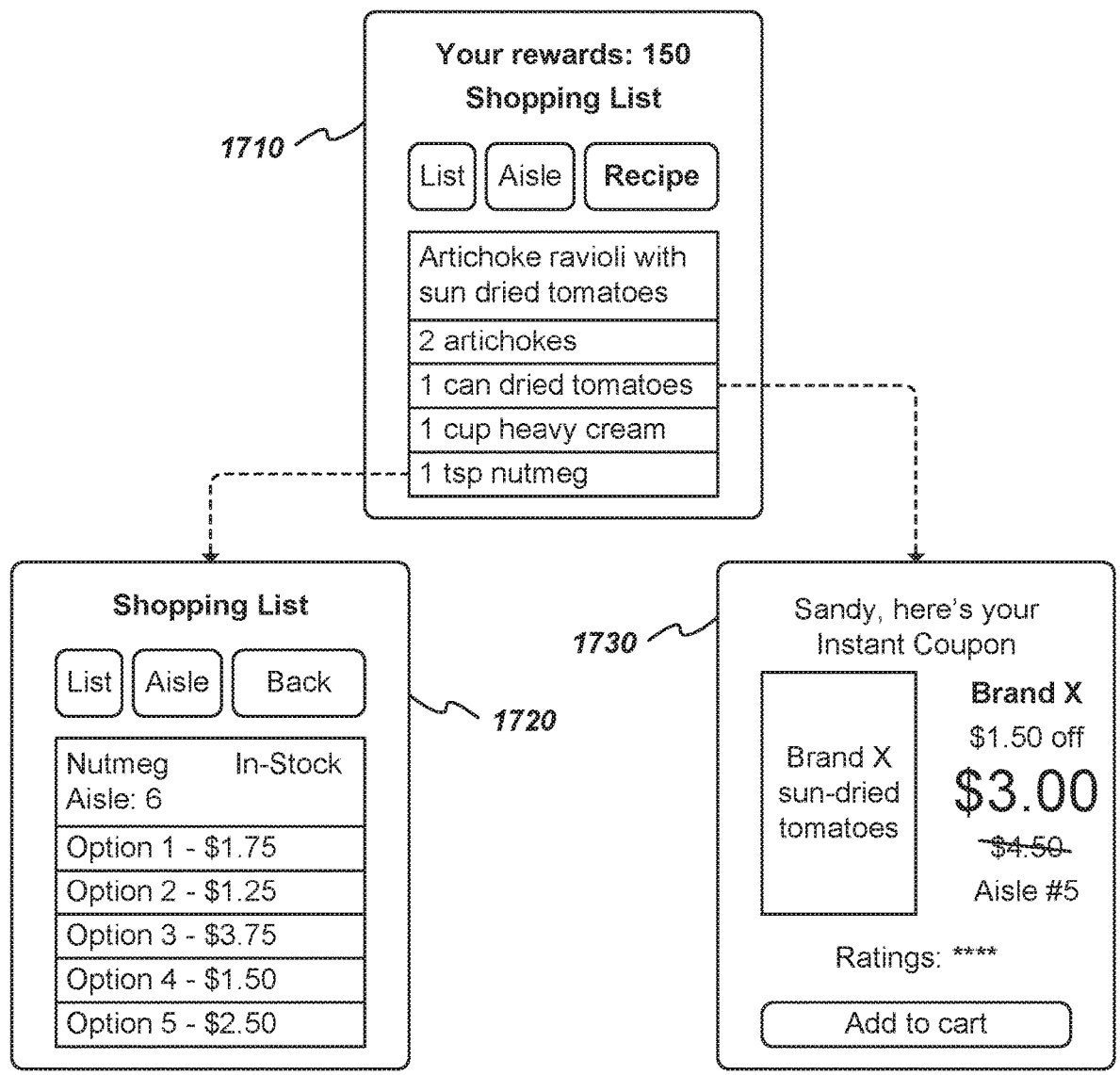
FIG. 17 illustrates several example graphical user interfaces (GUIs) provided by some embodiments.

FIG. 17 illustrates several example GUIs 1710-1730 provided by some embodiments. Specifically, this figure shows various example screens that may be displayed to a consumer during a shopping excursion. As shown, the first GUI 1710 includes a main navigation screen with various selectable buttons, selectable list items, account indicators, etc.

The second GUI 1720 includes a product list sorted by brand which may include inventory and location within an establishment. The second GUI may be activated, for instance, when a user selects a list item (e.g., by pressing a touchscreen, by positioning a cursor, etc.). The third GUI 1730 may be activated, for instance, when a user selects a list item with an associated marketing offer. As shown, the third GUI 1730 may include various multimedia elements and may allow a user to receive some special savings (e.g., a coupon, a user-specific reward, etc.). In addition, this example shows that some elements may be personalized (e.g., the consumer may be referred to by her name, a nickname/username, and/or other appropriate ways).

In addition, such GUIs may include elements such as, for example, a rewards indicator (e.g., a display of points associated with a loyalty reward program), various ratings, recommendations, etc. The GUIs may also allow a user to perform actions (e.g., "add to cart", "add to loyalty card", "add to credit card rewards", etc.). This may allow, for instance, a user to utilize a loyalty rewards program without having to carry a rewards card.

One of ordinary skill in the art will recognize that the GUIs of FIG. 17 are exemplary in nature and may be implemented in various different ways without departing from the scope of the disclosure. For instance, although each GUI is represented as having various selection buttons, such selections may be made in various different ways (e.g., using voice commands, using a touch screen, etc.). As another example, various groups of listing elements may be formatted and displayed in various different ways (e.g., using tables, bulleted lists, etc.). As yet another example, various promotional elements may be presented in various appropriate ways (e.g., by providing multimedia content, by providing text-based content, etc.).

Figure 18:
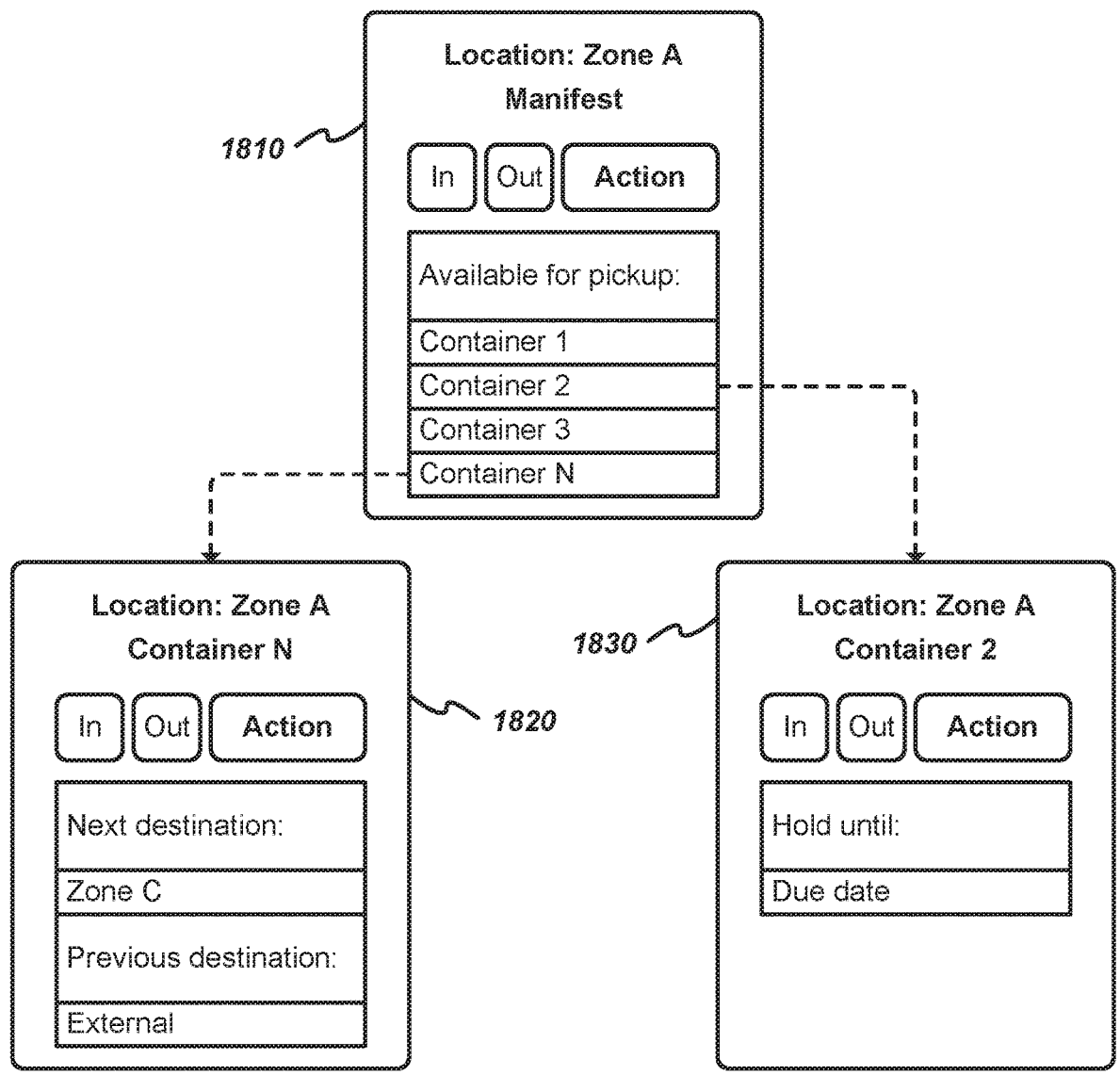
FIG. 18 illustrates several additional example graphical user interfaces (GUIs) provided by some embodiments.

FIG. 18 illustrates several example GUIs 1810-1830 provided by some embodiments. Specifically, this figure shows various example screens that may be displayed to an operator within a logistic environment. As shown, the first GUI 1810 includes a main navigation screen with various selectable buttons, selectable list items, labels, indicators, etc.

The second GUI 1820 includes information related to a particular container. The second GUI may be activated, for instance, when a user selects a list item (e.g., by pressing a touchscreen, by positioning a cursor, etc.). The third GUI 1830 may be activated, for instance, when a user selects a list item with an associated status or condition. As shown, the third GUI 1830 may include various special instructions or other appropriate content. In addition, the GUIs may allow an operator to enter information regarding the various containers (e.g., condition, special instructions, etc.) and/or other appropriate information.

One of ordinary skill in the art will recognize that the GUIs of FIG. 18 are exemplary in nature and may be implemented in various different ways without departing from the scope of the disclosure. For instance, although each GUI is represented as having various selection buttons, such selections may be made in various different ways (e.g., using voice commands, using a touch screen, etc.). As another example, various groups of listing elements may be formatted and displayed in various different ways (e.g., using tables, bulleted lists, etc.). As yet another example, various promotional elements may be presented in various appropriate ways (e.g., by providing multimedia content, by providing text-based content, etc.).

III. Methods of Operation

Figure 19:
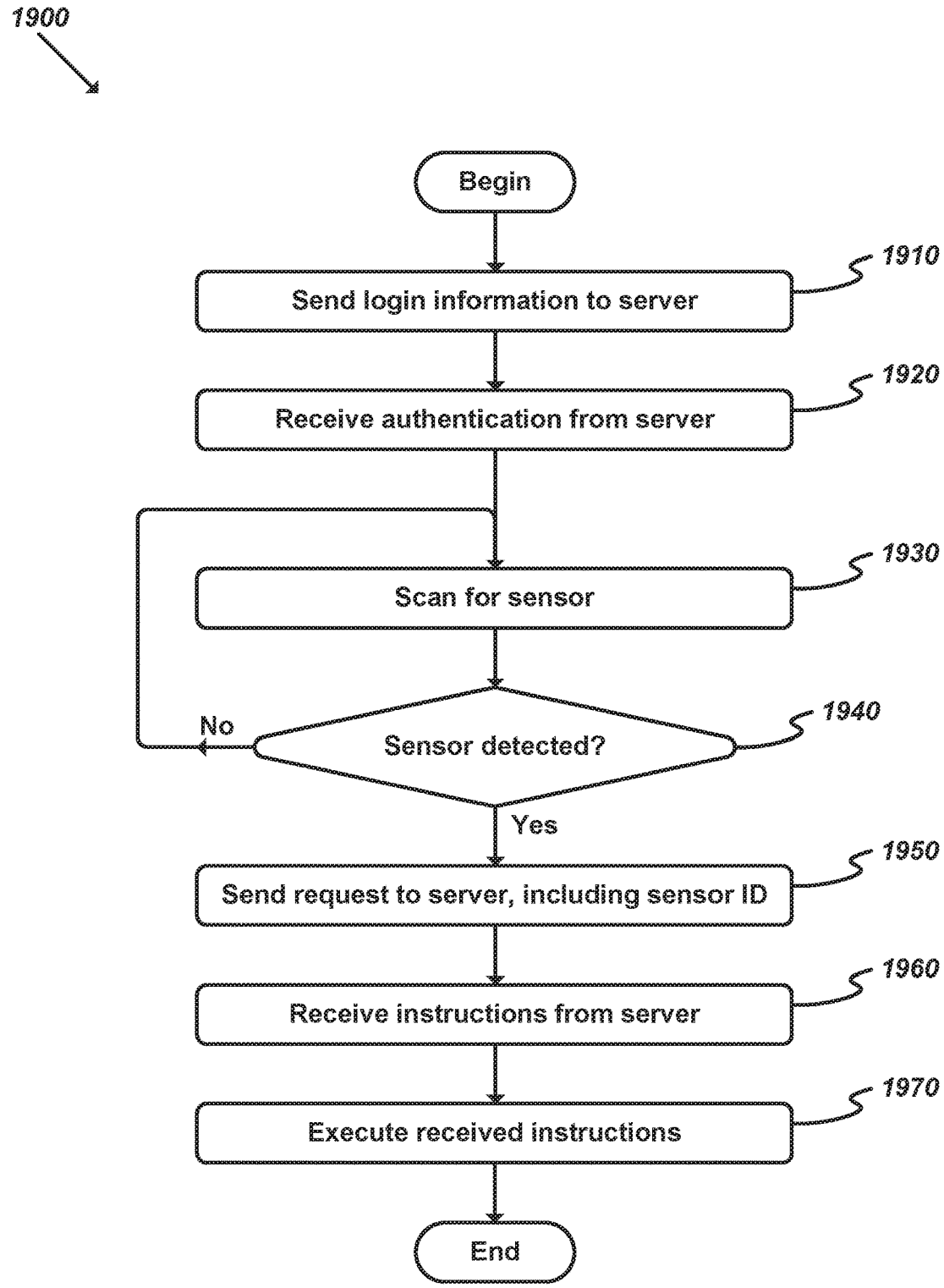
FIG. 19 illustrates a flow chart of an exemplary process used by some embodiments of the invention to allow a consumer to interact with the system of FIG. 1.

FIG. 19 illustrates a flow chart of an exemplary process 1900 used by some embodiments of the invention to allow a consumer to interact with the system 100. Process 1900 may begin, for instance, when a user launches a client application on a mobile device.

Process 1900 may then send (at 1910) login information to a server. Such login information may include a user account name, account password, device identification, etc. The process then may receive (at 1920) authentication from the server. Such authentication may include a message, flag, or other appropriate indication that the user has been authenticated (or not). When the user authentication is not received within a certain time period or when a rejection of the login information is received, the process may end.

Otherwise, when a valid authentication is received, the process may scan (at 1930) for a sensor. The process may then determine (at 1940) whether a sensor is detected. Such a determination may be based on various appropriate factors (e.g., proximity to the sensor, event(s) associated with the sensor, etc.). If a sensor is not detected, the process may repeatedly or continuously scan (at 1930) for a sensor until a sensor is detected or the client application is terminated.

If the process determines (at 1940) that a sensor has been detected, the process may send (at 1950) a request to the server. Such a request may include the sensor ID, user location, etc.

The process may then receive (at 1960) instructions from the server. Such instructions may include various actions to be performed by the user device (e.g., displaying a coupon, playing a sound, displaying a video, etc.) which may be associated with various multimedia data (e.g., coupons, advertisements, news, music, etc.) that may also be received from the server.

Next, process 1900 may execute (at 1970) any received instructions. After executing (at 1970) the received instructions, the process may end.

One of ordinary skill in the art will recognize that process 1900 is exemplary in nature and may be implemented in various different ways without departing from the scope of the disclosure. For instance, the operations may be performed in different orders. As another example, various operations may be omitted and/or other operations may be included. Furthermore, the process, or portions thereof, may be executed as part of a larger macro-process, and/or divided into multiple sub-processes. Moreover, the process, or portions thereof, may be executed continuously, at regular intervals, based on certain criteria, and/or in other appropriate ways.

Figure 20:
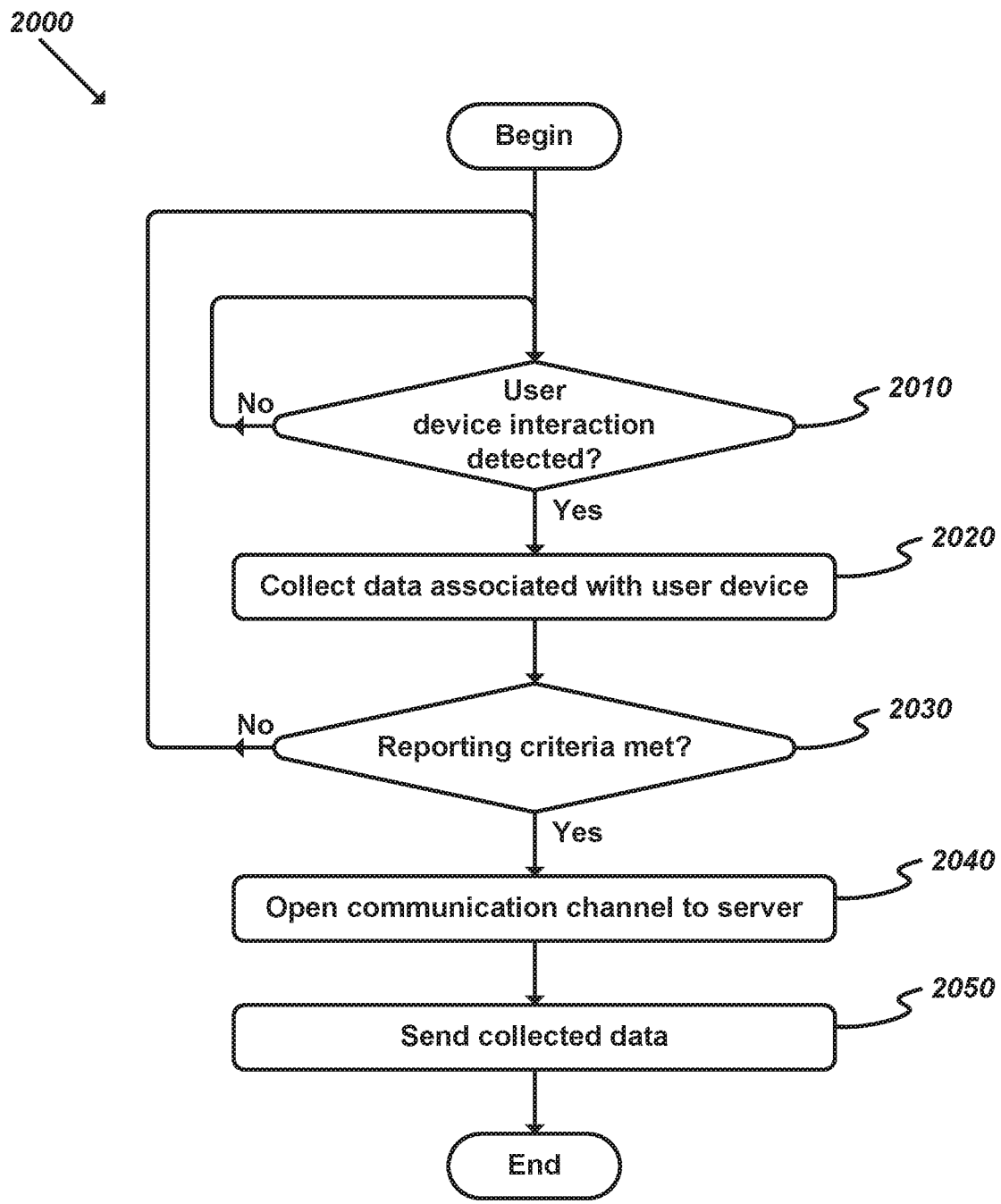
FIG. 20 illustrates a flow chart of an exemplary process used by some embodiments of the invention to allow reporting of consumer interactions via the system of FIG. 3.

FIG. 20 illustrates a flow chart of an exemplary process 2000 used by some embodiments of the invention to allow reporting of consumer interactions via system 300. Process 2000 may be executed at least partly by a device such as sensor 700 described above. Process 2000 may begin, for instance, when a sensor is powered on.

Process 2000 may then determine (at 2010) whether interaction with a user device has been detected. Such detection may be based on various relevant factors. For instance, in some embodiments a sensor may be able to detect signals sent from the user device (e.g., Bluetooth signals, WiFi signals, etc.).

If the process determines (at 2010) that interaction with a user device has not been detected, the process may repeat operation 2010 until the process determines (at 2010) that interaction with a user device has been detected. If the process determines (at 2010) that interaction with a user device has been detected, the process may then collect (at 2020) data associated with the user device. Such data may include information such as device type, connection type, information regarding a user of the device, etc.

The process may then determine (at 2030) whether some reporting criteria have been met (e.g., a minimum number of device interactions detected, a length of time since the last report was sent, etc.). If the process determines (at 2030) that the reporting criteria has not been met, the process may repeat operations 2010-2030 until the process determines (at 2030) that the reporting criteria has been met.

If the process determines (at 2030) that the reporting criteria have been met, the process may then open (at 2040) a communication channel to the server (e.g., by sending a message over one or more network connections). Next, the process may send (at 2050) the collected data to the server and then end. Such data may be associated with a particular sensor ID (which may, in turn, be associated with a particular location or element).

Such data may be stored by the server and made available to various third parties, as appropriate. For instance, an advertiser may place a sensor in proximity to an advertising element (e.g., a sign, a billboard, etc.) and collect data regarding traffic, effectiveness and engagement of mobile users, etc. In some embodiments, such data may be collected by a server via the user devices (e.g., using system 100) using the sensor ID.

In some embodiments, the sensor may collect data regarding each user device and send the data to the server. The server may, in turn, send a message to the user device based on some notification criteria (e.g., the user's opt-in to receive such messages, a relevance of some offer to a particular user's preferences, etc.).

One of ordinary skill in the art will recognize that process 2000 is exemplary in nature and may be implemented in various different ways without departing from the scope of the disclosure. For instance, the operations may be performed in different orders. As another example, various operations may be omitted and/or other operations may be included. Furthermore, the process, or portions thereof, may be executed as part of a larger macro-process, and/or divided into multiple sub-processes. Moreover, the process, or portions thereof, may be executed continuously, at regular intervals, based on certain criteria, and/or in other appropriate ways.

Figure 21:
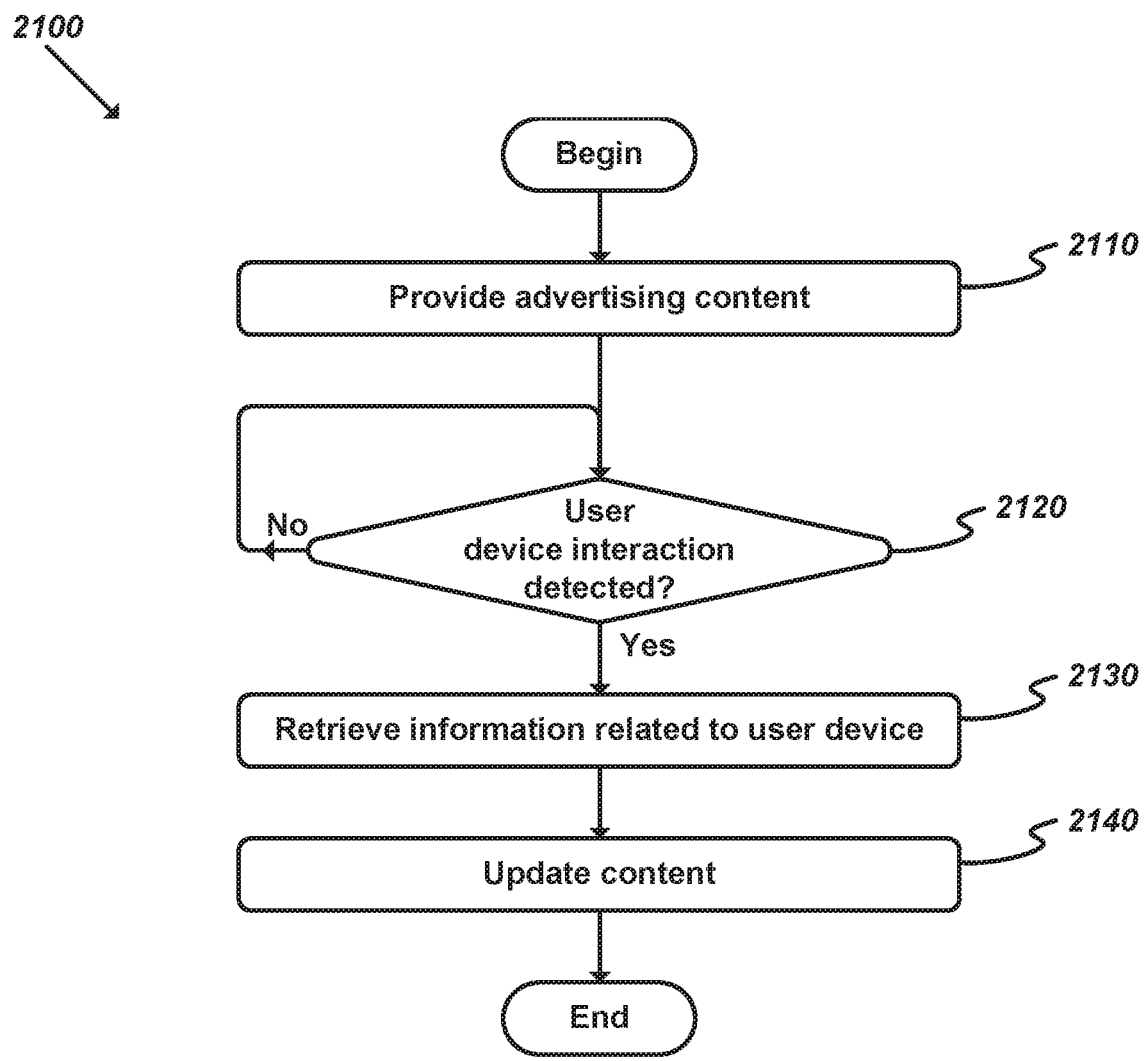
FIG. 21 illustrates a flow chart of an exemplary process used by some embodiments of the invention to provide targeted advertising via the system of FIG. 3.

FIG. 21 illustrates a flow chart of an exemplary process 2100 used by some embodiments of the invention to provide targeted advertising via system 300. Process 2100 may be executed at least partly by a device such as sensor 700 described above and/or one or more advertising mediums such as medium 310 described above. Process 2100 may begin, for instance, when a sensor and/or advertising medium is powered on.

Next, the process may provide (at 2110) advertising content. Such content may include, for instance, video content, audio content, multimedia content, etc. Such content may be provided via various appropriate systems and/or devices (e.g., video monitors and/or displays, audio output devices such as amplifiers and speakers, multi-position billboards, interactive devices such as tablets, etc.).

Process 2100 may then determine (at 2120) whether interaction with a user device has been detected. Such detection may be based on various relevant factors. For instance, in some embodiments a sensor may be able to detect signals sent from the user device (e.g., Bluetooth signals, WiFi signals, etc.).

If the process determines (at 2120) that interaction with a user device has not been detected, the process may repeat operation 2120 until the process determines (at 2120) that interaction with a user device has been detected. If the process determines (at 2120) that interaction with a user device has been detected, the process may then retrieve (at 2130) information related to the user device. Such information may include, for instance, device type, connection type, information regarding a user of the device, etc.

The process may then update (at 2140) the advertising content. Such an update may involve sending content to display or other external device, sending a control signal or message that causes the advertising medium to update the displayed content (e.g., by cycling to a next display in a multi-display billboard), and/or other appropriate ways. In some embodiments, the process may send a message to the user device (when determining that a user has opted-in to receive such messages) regarding the displayed content (e.g., a coupon or other special offer that is not available to users that have not opted-in or to the general public).

One of ordinary skill in the art will recognize that process 2100 is exemplary in nature and may be implemented in various different ways without departing from the scope of the disclosure. For instance, the operations may be performed in different orders. As another example, various operations may be omitted and/or other operations may be included. Furthermore, the process, or portions thereof, may be executed as part of a larger macro-process, and/or divided into multiple sub-processes. Moreover, the process, or portions thereof, may be executed continuously, at regular intervals, based on certain criteria, and/or in other appropriate ways.

Figure 22:
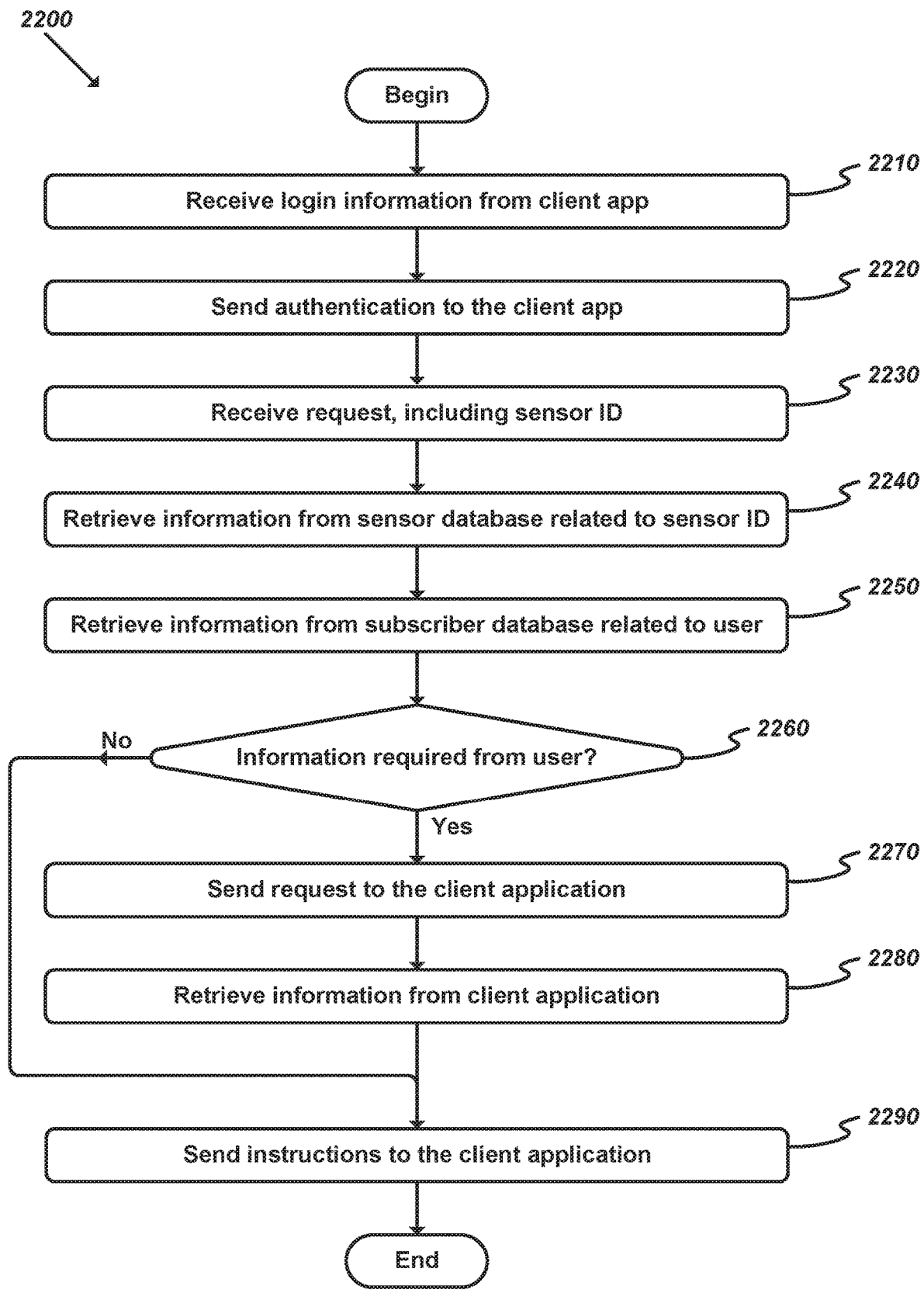
FIG. 22 illustrates a flow chart of an exemplary process used by some embodiments of the invention to communicate among the server(s) and user application(s) during consumer interaction.

FIG. 22 illustrates a flow chart of an exemplary process 2200 used by some embodiments of the invention to communicate among the server(s) and user application(s) during consumer interaction. The process may begin, for instance, when a client application attempts to communicate with a server application of some embodiments.

Next, the process may receive (at 2210) login information from the client application. Such login information may include a username, password, device identification, and/or other appropriate information.

The process may then send (at 2220) an authentication to the client application. Such authentication may include a confirmation signal, message, and/or other appropriate indicator that the login information has been verified.

Next, the process may receive (at 2230) a request. Such a request may include a sensor ID and other appropriate information (e.g., user location).

Process 2200 may then retrieve (at 2240) information from a sensor database related to the sensor ID. Such information may include sensor type, sensor location, etc.

Next, the process may retrieve (at 2250) information from a subscriber database related to one or more users associated with the user account. Such information may include, for example, historic purchase records, user preferences, etc.

The process then may determine (at 2260) whether additional information is required from the user. Such a determination may be based at least partly on the selected sensor and/or user account. For example, certain sensors may require additional information (e.g., user age, sex, etc.) to verify whether an event should be triggered.

If the process determines (at 2260) that additional information is required, the process may send (at 2270) a request to the client application. Such a request may include a listing the required additional information.

The process may then retrieve (at 2280) the requested information from the client application (e.g., by prompting the user to make various entries and/or selections).

After retrieving (at 2280) information from the client application, or if the process determines (at 2260) that information from the user is not required, the process may then send (at 2290) instructions to the client application. Such instructions may include various multimedia data (e.g., coupons, advertisements, news, music, etc). For example, the server may send a link for users, which may include a coupon, advertisement, music, etc. After sending (at 2290) instructions to the client application, the process may end.

One of ordinary skill in the art will recognize that process 2200 is exemplary in nature and may be implemented in various different ways without departing from the scope of the disclosure. For instance, the operations may be performed in different orders. As another example, various operations may be omitted and/or other operations may be included. Furthermore, the process, or portions thereof, may be executed as part of a larger macro-process, and/or divided into multiple sub-processes. Moreover, the process, or portions thereof, may be executed continuously, at regular intervals, based on certain criteria, and/or in other appropriate ways.

Figure 23:
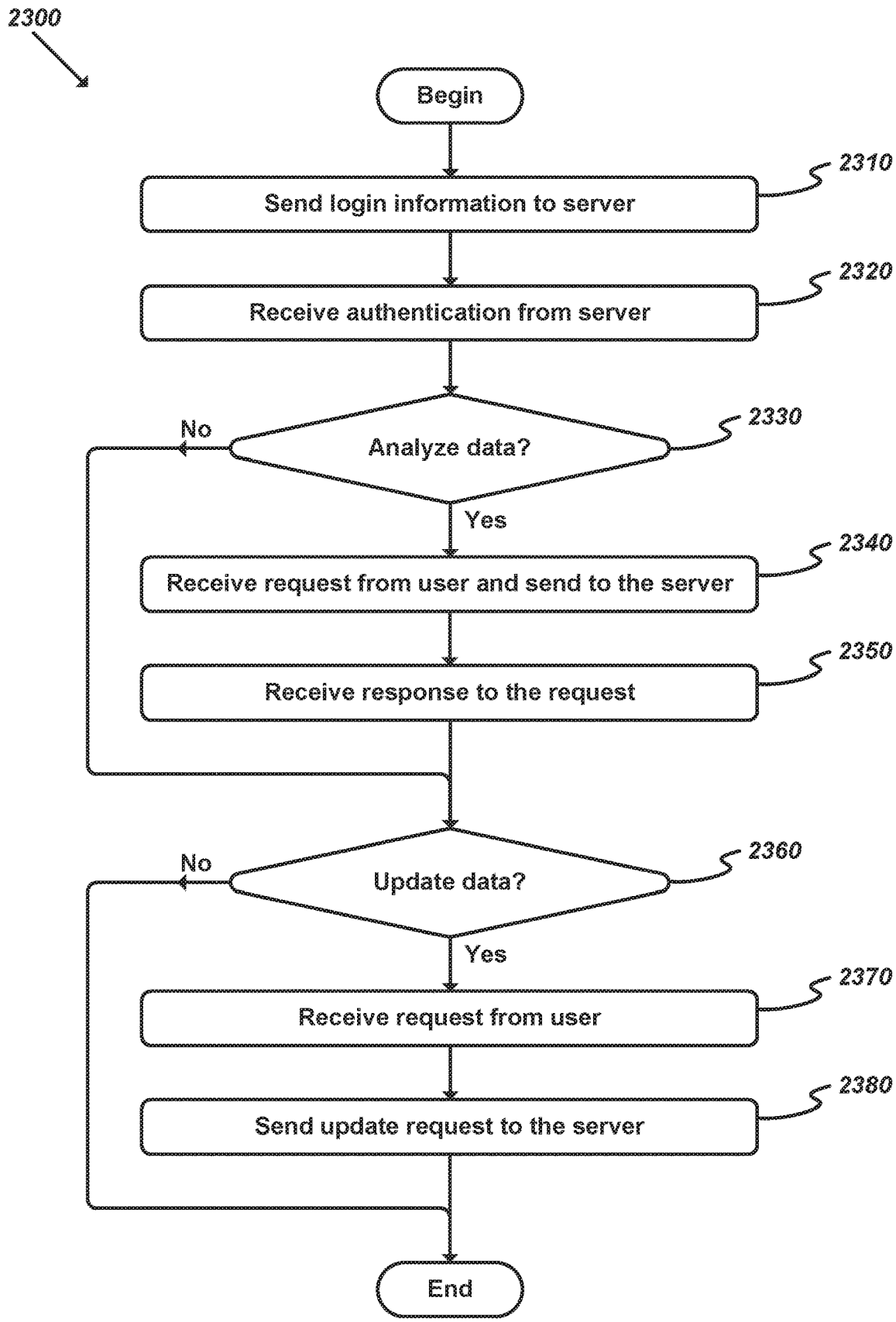
FIG. 23 illustrates a flow chart of an exemplary process used by some embodiments of the invention to allow a user to interact with the system of FIG. 1.

FIG. 23 illustrates a flow chart of an exemplary process 2300 used by some embodiments of the invention to allow a user to interact with the system 100. Process 2300 may begin, for instance, when a user launches a user application on a mobile device.

Process 2300 may then send (at 2310) login information to the server. Such login information may include a username, password, device ID, etc. Next, the process may receive (at 2320) authentication from the server. Alternatively, authentication may not be received and the process may end. The process may then determine (at 2330) whether data analysis is required. Such a determination may be based on data entered by a user (e.g., the user may select a data analysis option, provide a dataset for analysis, and/or otherwise indicate that analysis is required). If the process determines (at 2330) that data analysis is required, the process may receive (at 2340) a request from the user and send it to the server. Such a request may include data such as user type, establishment type, establishment location, etc.

Next, the process may receive (at 2350) a response to the request. Such a response may include different types of data (e.g., a table, list, etc.). After receiving (at 2350) a response to the request, or if the process determines (at 2330) that data analysis is not required, the process may then determine (at 2360) whether to update data. Such a determination may be made based on various relevant factors (e.g., availability of new data, a user update request, etc.).

If the process determines (at 2360) that an update is to be made, the process may receive (at 2370) an update request from the user. Such a request may include various data attributes to be updated (e.g., sensor data, campaign data, etc.). Next, the process may send (at 2380) the update request to the server.

After sending (at 2380) the update request to the server, or if the process determines (at 2360) that no data updates are required, the process may end.

One of ordinary skill in the art will recognize that process 2300 is exemplary in nature and may be implemented in various different ways without departing from the scope of the disclosure. For instance, the operations may be performed in different orders. As another example, various operations may be omitted and/or other operations may be included. Furthermore, the process, or portions thereof, may be executed as part of a larger macro-process, and/or divided into multiple sub-processes. Moreover, the process, or portions thereof, may be executed continuously, at regular intervals, based on certain criteria, and/or in other appropriate ways.

Figure 24:
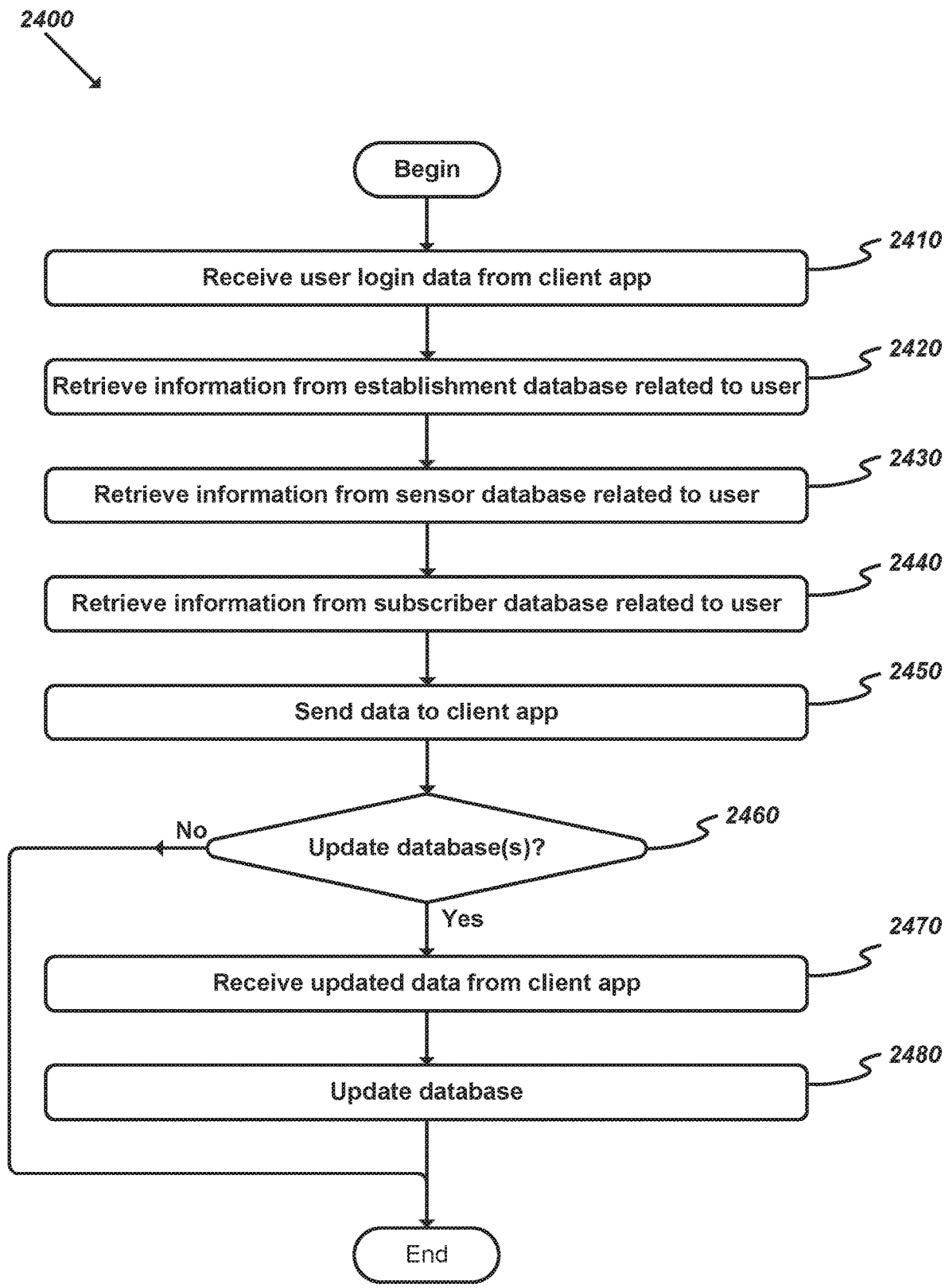
FIG. 24 illustrates a flow chart of an exemplary process used by some embodiments of the invention to communicate among the server(s) and user application(s) during user interaction.

FIG. 24 illustrates a flow chart of an exemplary process 2400 used by some embodiments of the invention to communicate among the server(s) and user application(s) during user interaction. The process may begin, for instance, when an establishment-user or manufacturer-user launches a client application.

Next, the process may receive (at 2410) user login data from a client application. Such login information may include a username, password, device ID, and/or other appropriate information. The process then may retrieve (at 2420) information from an establishment database related to the user.

Next, the process may retrieve (at 2430) information from a sensor database related to the user. Process 2400 may then retrieve (at 2440) information from a subscriber database related to the user.

The process may then send (at 2450) data to a client application. Such data may include establishment, sensor and/or subscriber information.

The process then may determine (at 2460) whether to update database(s) associated with the user. If the process determines (at 2460) that an update to the database(s) is needed, the process may receive (at 2470) updated data from the client application. Such data may include establishment data, sensor data, etc. Next, the process may update (at 2480) the database(s) based on the received data.

After updating (at 2480) the database(s), or if the process determines (at 2460) that updated database(s) are not requested, the process may end.

One of ordinary skill in the art will recognize that process 2400 is exemplary in nature and may be implemented in various different ways without departing from the scope of the disclosure. For instance, the operations may be performed in different orders. As another example, various operations may be omitted and/or other operations may be included. Furthermore, the process, or portions thereof, may be executed as part of a larger macro-process, and/or divided into multiple sub-processes. Moreover, the process, or portions thereof, may be executed continuously, at regular intervals, based on certain criteria, and/or in other appropriate ways.

Figure 25:
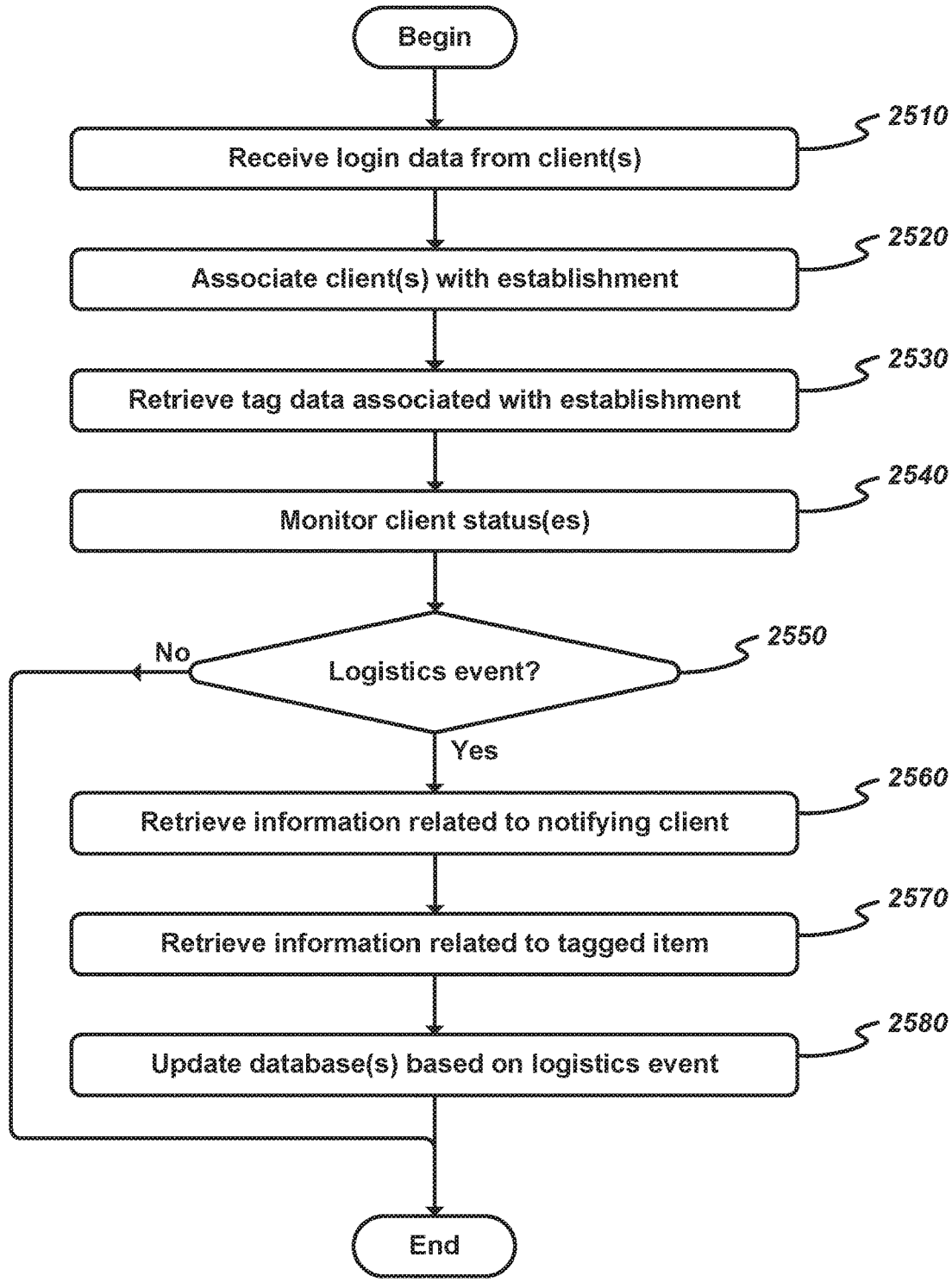
FIG. 25 illustrates a flow chart of an exemplary process used by some embodiments of the invention to monitor logistics events.

FIG. 25 illustrates a flow chart of an exemplary process 2500 used by some embodiments of the invention to monitor logistics events. The process may begin, for instance, when an establishment-user launches a client application. Such a client application may be executed by a mobile device or locator such as those described above.

Next, the process may receive (at 2510) login data from one or more clients. The process may then associate (at 2520) the clients with a particular establishment (and/or otherwise appropriately arrange the clients.

Process 2500 may then retrieve tag data associated with the establishment (or other appropriate grouping). Such data may include, for instance, data related to items that have previously been associated with the establishments (e.g., containers located within a warehouse).

Next, the process may monitor (at 2540) client status(es) and determine (at 2550) whether a logistics event has occurred. Such a determination may be made in various appropriate ways based on data received from the client application(s). For instance, any proximity event may be treated as a logistics event. As another example, a change in location (e.g., from a first zone to a second zone) may be identified as a logistics event. A logistics event may be identified based on data received from locators and/or user devices.

When the process determines (at 2550) that a logistics event has not occurred, the process may end. When the process determines that a logistics event has occurred, the process may retrieve (at 2560) information related to the notifying client. Such information may include, for example, an establishment associated with the client, the location of the client (e.g., a known location of a locator may be retrieved from a database, a GPS determined location of a mobile device, etc.), a type of client (e.g., fixed location, roving, etc.), and/or other relevant information (e.g., whether the client is associated with a particular user or operator).

Next, the process may retrieve (at 2560) information related to the tagged item or items. Such information may be based at least partly on a sensor identifier included in a sensor beacon signal. The retrieved information may include, for instance, previous logistics events associated with the tagged item, a status of the tagged item, and/or other relevant information such as a list of good included in a container, physical attributes of a container (e.g., size, weight, material type, etc.), destination, etc.

The process may then update (at 2580) various databases based at least partly on the logistics event and then end. In addition, various messages or instructions may be sent to other devices and/or systems. Such updates, messages, and/or instructions may include for instance, updates to a location associated with a tagged item, status messages sent to operators, instructions or updates sent to a third party system associated with the tagged item or locator, etc.

In some embodiments, operations 2540-2580 may be iteratively performed continuously, at regular intervals, based on identified events, and/or based on other appropriate criteria.

One of ordinary skill in the art will recognize that process 2500 is exemplary in nature and may be implemented in various different ways without departing from the scope of the disclosure. For instance, the operations may be performed in different orders. As another example, various operations may be omitted and/or other operations may be included. Furthermore, the process, or portions thereof, may be executed as part of a larger macro-process, and/or divided into multiple sub-processes. Moreover, the process, or portions thereof, may be executed continuously, at regular intervals, based on certain criteria, and/or in other appropriate ways.

Figure 26:
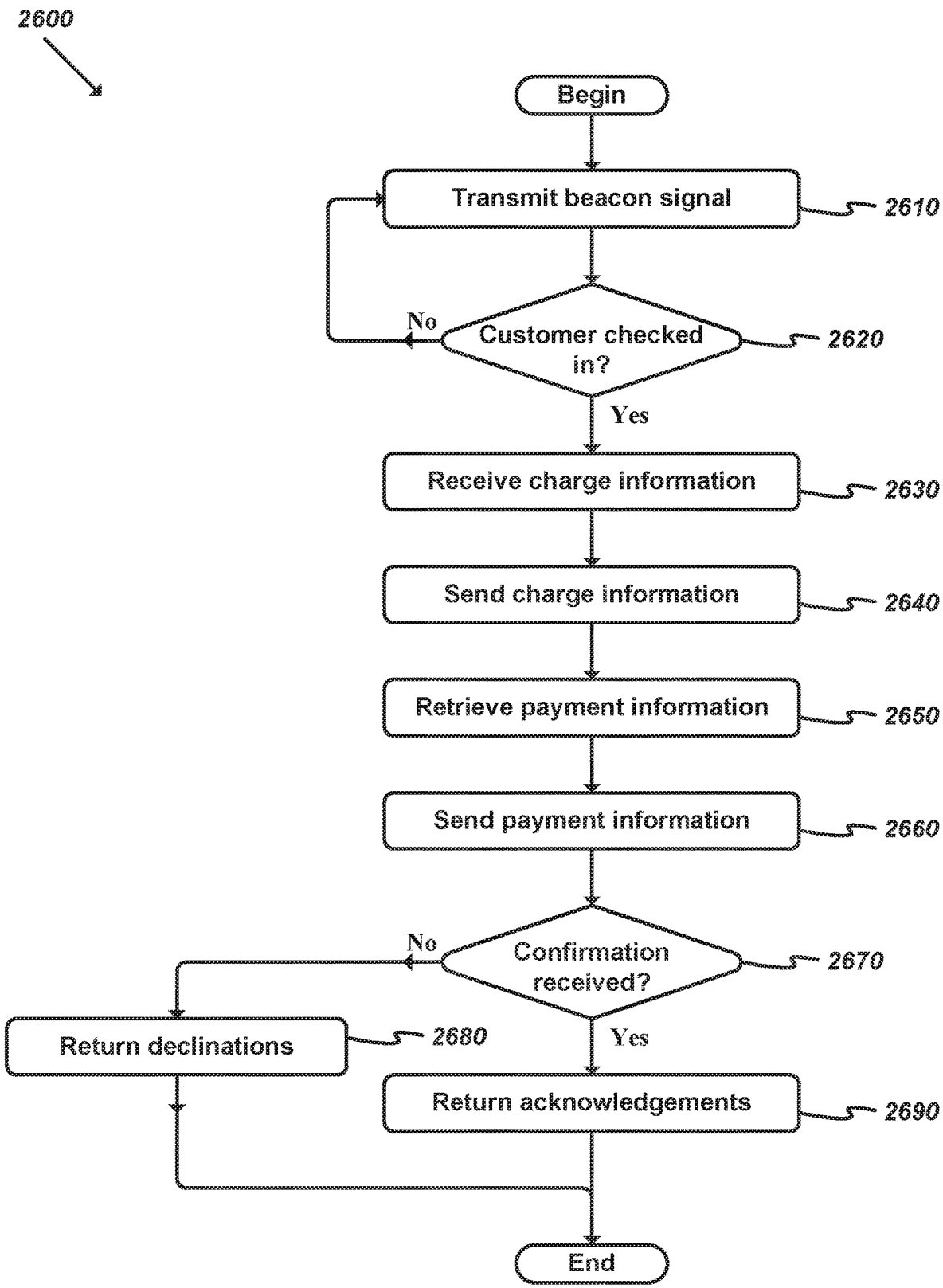
FIG. 26 illustrates a flow chart of an exemplary process used by some embodiments to enable point of sale transactions.

FIG. 26 illustrates a flow chart of an exemplary process 2600 used by some embodiments to enable point of sale transactions. Such a process may be executed by a device such as smart beacon 420 described above. The process may start, for instance, when the smart beacon is connected to a POS terminal and/or other appropriate device.

As shown, the process may transmit (at 2610) a beacon signal. Such a signal may be similar to those described above and may include a unique identifier associated with the smart beacon. The transmitted identifier may be associated with a particular merchant, register, etc. In addition to the identifier, the beacon may include a unique encryption and/or decryption key used for security authentication.

Next, the process may determine (at 2620) whether a customer has checked in. Such a determination may be made based on various appropriate criteria, such as receiving a response to the beacon signal over a Bluetooth link. Some embodiments may include various other interfaces that may allow check-in via the app of some embodiments (e.g., near field communications, scanning of graphic codes, etc.). In some embodiments, the check-in process may include sending, from the user device (and/or associated app), information such as a rewards ID, rewards balance, etc.

If the process determines (at 2620) that no customer has checking in, the process may repeat operations 2610-2620 until determining that a customer has checked in. If the process determines (at 2620) that a customer has checked in, the process may then receive (at 2630) charge information from the vendor (e.g., via a POS terminal). Such information may include, for instance, a bill of sale, invoice, list of items, total amount, etc.

Next, the process may send (at 2640) the charge information to the customer device. Such information may be sent over any appropriate channel (e.g., wireless link if available, wired connection, through graphic codes, etc.).

The process may then retrieve (at 2650) payment information. Such information may be retrieved at the user device (e.g., through an app of some embodiments) and received by the smart beacon of some embodiments for transfer to a POS terminal or other appropriate merchant interface. Some embodiments may include an authorization or verification, whereby, for example, a user may be presented with an invoice, total amount, etc. and be presented with an appropriate UI element such as a "confirm" button.

Process 2600 may then send (at 2660) the retrieved payment information to a back office system or other appropriate processing resource. Such information may be sent via the user device and/or the smart beacon across one or more networks. The communication pathway may depend on the capabilities of the various devices and/or whether network connectivity is available to each device. The payment processing may be performed by a cloud-based resource accessed by the user device and/or smart beacon. Alternatively, in some cases, the transaction information may be sent to a credit card processor, terminal, etc., for processing over an appropriate communication pathway.

Next, the process may determine (at 2670) whether a confirmation has been received from the payment processing entity. If the process determines that no confirmation was received (or that a rejection was received), the process may return (at 2680) declination messages to the user device and/or terminal and then may end.

If the process determines (at 2670) that a confirmation or authorization has been received, the process may return (at 2690) acknowledgement messages to the user device and/or terminal and then may end.

In some cases, process 2600 may be performed automatically without interaction from any part. For instance, a user may place an order at a retail establishment, whether online, over the phone, in person, etc. Then, when the user enters the establishment (as noted by the smart beacon interacting with a user device, for instance), the pending order may have the payment automatically processed based on the proximity of the user.

In some embodiments, the process may further send user data (e.g., rewards balance, notifications, etc.) to the user device, POS terminal, and/or remote server.

One of ordinary skill in the art will recognize that process 2600 is exemplary in nature and may be implemented in various different ways without departing from the scope of the disclosure. For instance, the operations may be performed in different orders. As another example, various operations may be omitted and/or other operations may be included. Furthermore, the process, or portions thereof, may be executed as part of a larger macro-process, and/or divided into multiple sub-processes. Moreover, the process, or portions thereof, may be executed continuously, at regular intervals, based on certain criteria, and/or in other appropriate ways.

Figure 27:
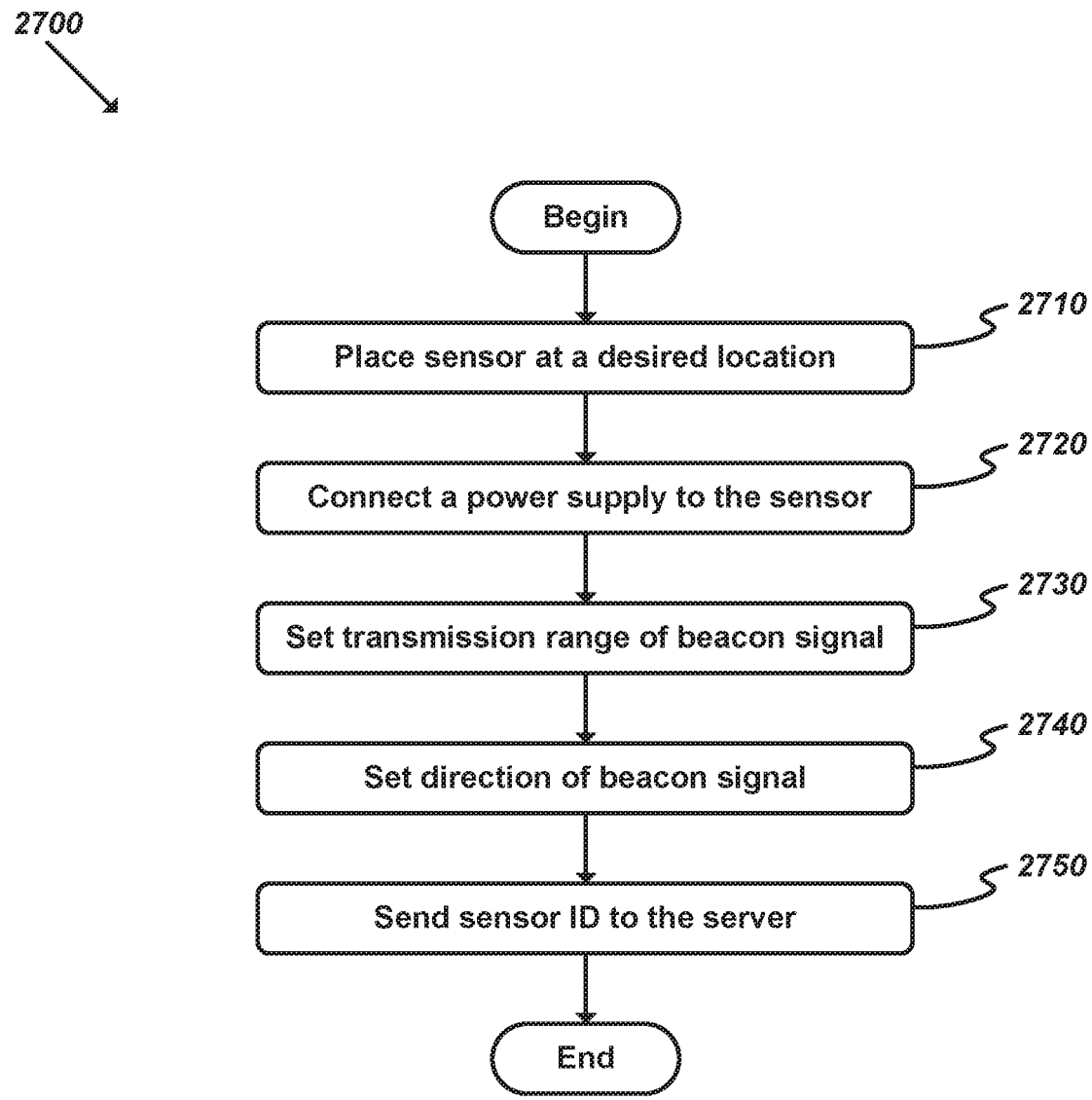
FIG. 27 illustrates a flow chart of an exemplary process used by some embodiments to configure a sensor used by some embodiments of the system of FIG. 1.

FIG. 27 illustrates a flow chart of an exemplary process 2700 used by some embodiments to configure a sensor used by some embodiments of the system 100. Such a process may begin, for instance, when an establishment and/or manufacturer decides to install a sensor.

Process 2700 may then place (at 2710) the sensor at a desired location. For example, the establishment-user and/or manufacturer-user may place the sensor at an appropriate location within an establishment.

Next, the process may connect (at 2720) a power supply to the sensor. Such a power supply may be connected by inserting a set of batteries into the sensor, connecting an AC power supply to the sensor, and/or other appropriate ways.

The process may then set (at 2730) a transmission range of a beacon signal associated with the sensor. The transmission range of the beacon signal may be configured in various appropriate ways (e.g., by manipulating server data associated with the sensor, by programming the internal memory of the sensor, etc.).

After setting (at 2730) the transmission range, the process then may set (at 2740) a direction of the beacon signal. The direction may be set relative to a defined location of the sensor. The angle and/or spread (or span) of the beacon signal may also be programmed.

Next, the process may send (at 2740) the sensor ID to the server. In some embodiments, the sensor ID may already be known to the server, and the sensor may be associated with a particular location, establishment, etc. After sending (at 2740) the sensor ID to the server, the process may end.

One of ordinary skill in the art will recognize that process 2700 is exemplary in nature and may be implemented in various different ways without departing from the scope of the disclosure. For instance, the operations may be performed in different orders. As another example, various operations may be omitted and/or other operations may be included. Furthermore, the process, or portions thereof, may be executed as part of a larger macro-process, and/or divided into multiple sub-processes. Moreover, the process, or portions thereof, may be executed continuously, at regular intervals, based on certain criteria, and/or in other appropriate ways.

Figure 28:
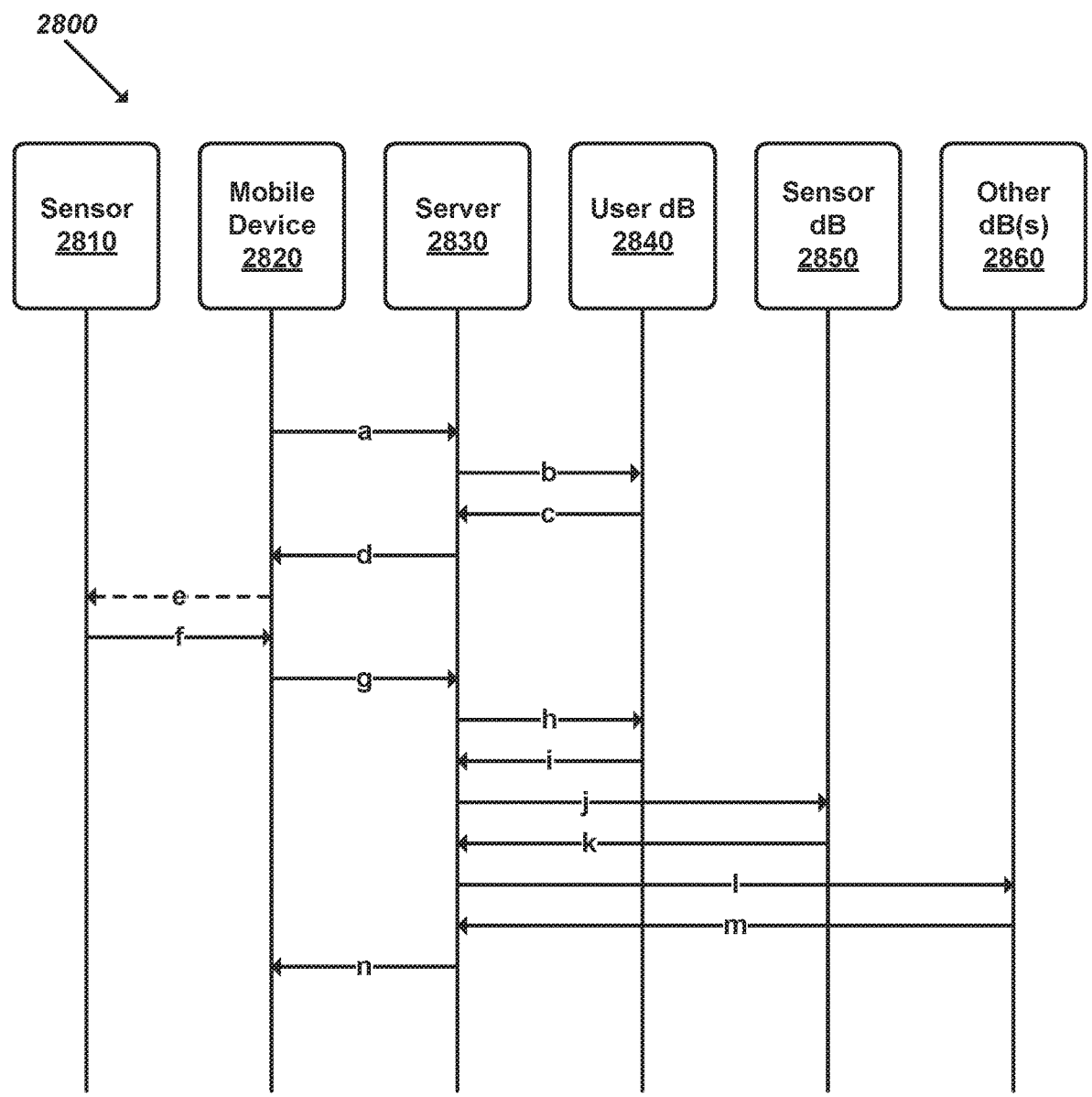
FIG. 28 illustrates an exemplary message flow diagram used by some embodiments of the invention to communicate among various elements of the system of FIG. 1.

FIG. 28 illustrates an exemplary message flow diagram 2800 used by some embodiments of the invention to communicate among various elements of the system 100. Specifically, this figure shows the message types and sequence of various communications sent among the components of the system. As shown, the message flow may include a sensor 2810, a mobile device 2820, a server 2830, a user database 2840, a sensor database 2850, and/or other databases 2860.

Sensor 2810 may be similar to sensor 700 described above in reference to FIG. 7. Mobile device 2820 may be a user device that includes one or more wireless communication features such as a smart phone, tablet, personal computer, etc. Server 2830 may include one or more remote devices that are able to communicate with various system elements (e.g., using one or more networks). User database 2840 may include various data elements related to a user of the system (e.g., username, password, shopping lists, etc.). Sensor database 2850 may include various data elements related to sensors provided by the system (e.g., sensor IDs, locations, etc.). The other databases 2860 may include various other data elements associated with the system (e.g., establishment IDs, manufacturer IDs, offers, usage statistics, etc.).

During operation, a consumer may use a mobile device, which may be running a client application, to trigger a proximity event. The example of FIG. 28 is for descriptive purposes, as many different message flows may be implemented, depending on various relevant factors (e.g., user preferences, placement of sensor(s), availability of network connections, etc.).

As shown, the mobile device 2820 may send a message 'a' to the server 2830. Such a message may include information such as a user name and password. The server may, in turn, send a message 'b' to the user database 2840. Such a message may be a request for a password or other information associated with the user. The user database may send a response message 'c' that may include the requested information. Next, the server 2830 may send a message 'd' to the mobile device 2820. Such a message may include various data items related to the user, the user's account, and/or other appropriate data. The messages 'a'-'d' may be used in some embodiments to establish a live session among a user device and the server(s) of some embodiments.

Next, the mobile device 2820 may send a message 'e' to the sensor 2810, which may trigger a response message 'f' from the sensor to the mobile device. Such a response message may include the ID of the sensor. Alternatively, the mobile device 2820 may receive message 'f' from the sensor 2810 without first transmitting message 'e'. For instance, when the mobile device receives a periodically transmitted beacon signal.

Next, the mobile device 2820 may send a message 'g' to the server 2830. Such a message may include information such as the sensor ID, identifying information regarding the user (e.g., username and password), and/or other appropriate information. The server 2830 may, in turn, send a message 'h' to the user database 2840 requesting information related to the user (e.g., user preferences, user history, etc.). The user database may respond with a message 'i' that includes the requested information. The server 2830 may then send a message 'j' to the sensor database 2850 requesting information related to the sensor (e.g., sensor location, associated establishment or manufacturer(s), etc.). The sensor database may respond with a message 'k' that includes the requested information. Next, the server 2830 may send a message 'l' to the other databases 2860 requesting other information (e.g., information regarding the establishment, the manufacturers, etc.). The other databases may respond with a message 'm' that includes the requested information. Finally, the server 2830 may send a message 'n' to the mobile device 2820. Such a message may be based on various received information. The server 2830 may determine the appropriate contents of the message (e.g., based on an offer associated with the establishment or manufacturer, information related to the user's history or preferences, etc.).

After sending the message 'n', the flow may end. Alternatively, messages 'e'-'n' or 'f'-'n' may be continuously repeated as the mobile device encounters other sensors, generating various proximity events.

One of ordinary skill in the art will recognize that the message flow described in reference to message flow diagram 2800 is exemplary in nature and may be implemented in various different ways without departing from the scope of the disclosure. For instance, the messages may be sent or received in different orders. As another example, various messages may be omitted and/or other messages may be included. Furthermore, the message flow may be executed as part of a larger macro-flow, and/or divided into multiple sub-flows. Moreover, the message flow, or portions thereof, may be executed continuously, at regular intervals, based on certain criteria, and/or in other appropriate ways.

IV. Example Use Cases

The following sections will describe various use cases of specific example implementations that may use elements of the system, software, and/or methods described above. Such use cases are presented for example purposes only. One of ordinary skill in the art will recognize that different embodiments may implement various specific elements in various different ways.

In one example use case, multiple user devices may be used to collect information regarding a sensor. As each user device encounters a proximity event with the sensor, location information of the user device (e.g., a location determined using a GPS sub-system or application of the user device) may be sent to a server such that the approximate location of the sensor, and hence an object to which the sensor is attached, may be determined by aggregation of location reports transmitted by multiple user devices which were instructed by an application server to report their locations upon moving within a threshold proximity of the sensor. The server may store this information such that interested parties may review and analyze the information.

In another example use case of the present invention, a wireless sensor may be placed at a retail establishment. A mobile application may scan and detect the presence of a beacon signal transmitted by the wireless sensor. The mobile application, which may run on a user device may communicate with a server application. The server application may retrieve sensor data from a sensor database and user-specific data (e.g., gender, age group, ethnicity, income level, personal interests, etc.) from a user database and communicate with the mobile application to present a visual or audible targeted advertisement, sales coupon or special offer that matches a profile associated with the user. The advertisement may be extracted from a pool submitted by corporate marketing departments, merchants, and/or other appropriate parties that have installed wireless sensors at their premises or at common areas in shopping malls, strip malls, and/or other appropriate locations.

In yet another example use case of the present invention, one or more wireless sensors may be placed in, on, or about landmarks and tourist locations run by entities interested in providing information services to visitors on their user devices. When the user device moves within a threshold proximity of the wireless sensor(s), the user device may communicate with an application server which may consult a sensor database based on a sensor ID. The application server may send relevant information in the form of multimedia to the mobile application with instructions as to how to display such information to the user. The information received from the application server may include, for example, text, audio, and/or video that includes relevant information regarding the place or landmark where the wireless sensor is located.

In still another use case of the present invention, a wireless sensor may be installed in an inconspicuous location inside, for example, a vehicle, motorcycle, truck or asset. If the vehicle or asset is lost or stolen, a third-party may report the incident to an application server. The application server may instruct a mobile application to silently monitor for beacon signals from a wireless sensor with the identifier of the lost or stolen vehicle or asset and in the event of a positive scan, which means that the sensor has been found in the proximity of the user device, the mobile application may send location and time information to the application server which may then be used by the third-party to assist in the recovery of the stolen or missing vehicle or asset.

In another use case of the present invention, a wireless sensor may be placed at, for example, a concert venue, theater or park. A third-party may choose to distribute promotional material pertaining to the event occurring at the venue. The attendee to the event may then be instructed to use a user device to obtain such promotional material. A mobile application running on the mobile device may communicate with an application server. The application server may send relevant promotional information based on the sensor ID and the information may be displayed and perceived by any user that moves within a threshold proximity of the wireless sensor.

In yet another use case of the present invention, a wireless sensor may be attached to a particular article (e.g., an item of clothing). A consumer with a user device running a mobile application may move within a threshold proximity to the sensor, thus triggering a proximity event. Such an event may cause a server application to send information regarding the particular article to the user device (e.g., the cost of the article, the materials included in the article, the care requirements of the article, manufacturing processes (e.g., environmental friendliness, fair trade standing, etc.), etc.).

V. Processes for Defining Proximity Event Applications

FIGS. 29-32 describe processes that may be used to define sets of instructions for providing proximity event applications (e.g., a server application, a user application, a consumer application, etc.). In some cases such sets of instructions are defined in terms of object-oriented programming code. Some embodiments may include sets of instructions for defining classes and instantiating various objects at runtime based on the defined classes. The sets of instructions may be stored to an appropriate non-volatile storage medium. In some embodiments, multiple applications may be included on a single medium.

Figure 29:
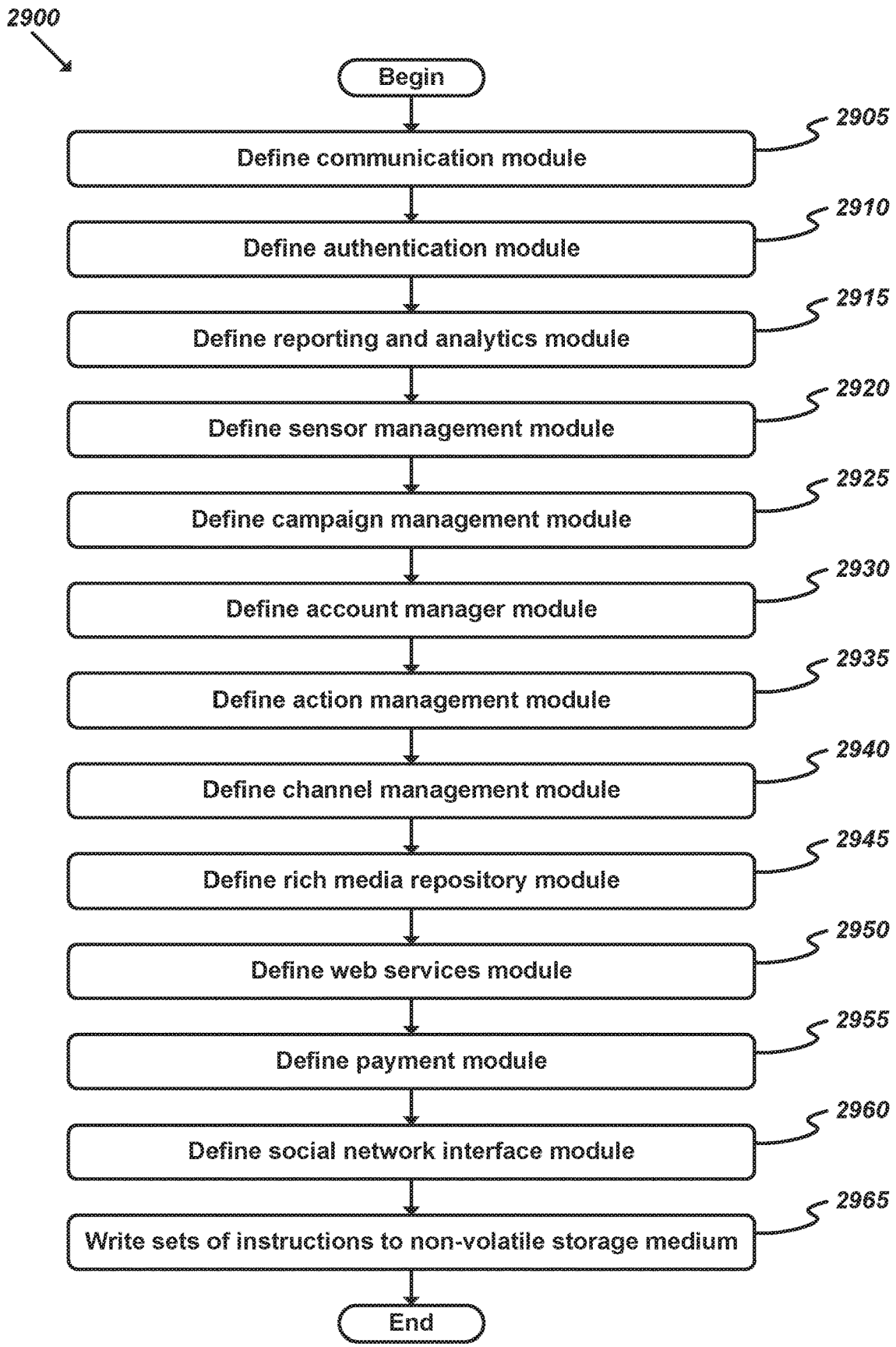
FIG. 29 illustrates an exemplary process of some embodiments for defining and storing a server-side application of some embodiments.

FIG. 29 illustrates an exemplary process 2900 of some embodiments for defining and storing a server-side application of some embodiments, such as application 1100 described above in reference to FIG. 11. Specifically, process 2900 illustrates the operations used to define sets of instructions for providing several of the elements shown in the server application 1100 and for performing various operations described above.

As shown, the process may define (at 2905) sets of instructions for providing a communication module. The process may then define (at 2910) sets of instructions for providing an authentication module. Next, the process may define (at 2915) sets of instructions for providing a reporting and analytics module. Process 2900 may then define (at 2920) sets of instructions for providing a sensor management module. The process then may define (at 2925) sets of instructions for providing a campaign management module. Next, the process may define (at 2930) sets of instructions for providing an account manager module.

Process 2900 may then define (at 2935) sets of instructions for providing an action management module. Next, the process may define (at 2940) sets of instructions for providing a channel management module. The process may then define (at 2945) sets of instructions for providing a rich media repository module. Process 2900 may then define (at 2950) sets of instructions for providing a web services module. Next, process 2900 may define (at 2955) sets of instructions for providing a payment module. The process may then define (at 2960) sets of instructions for providing a social network interface module. Process 2900 may then write (at 2965) the sets of instructions defined at operations 2905-2960 to a non-volatile storage medium.

Figure 30:
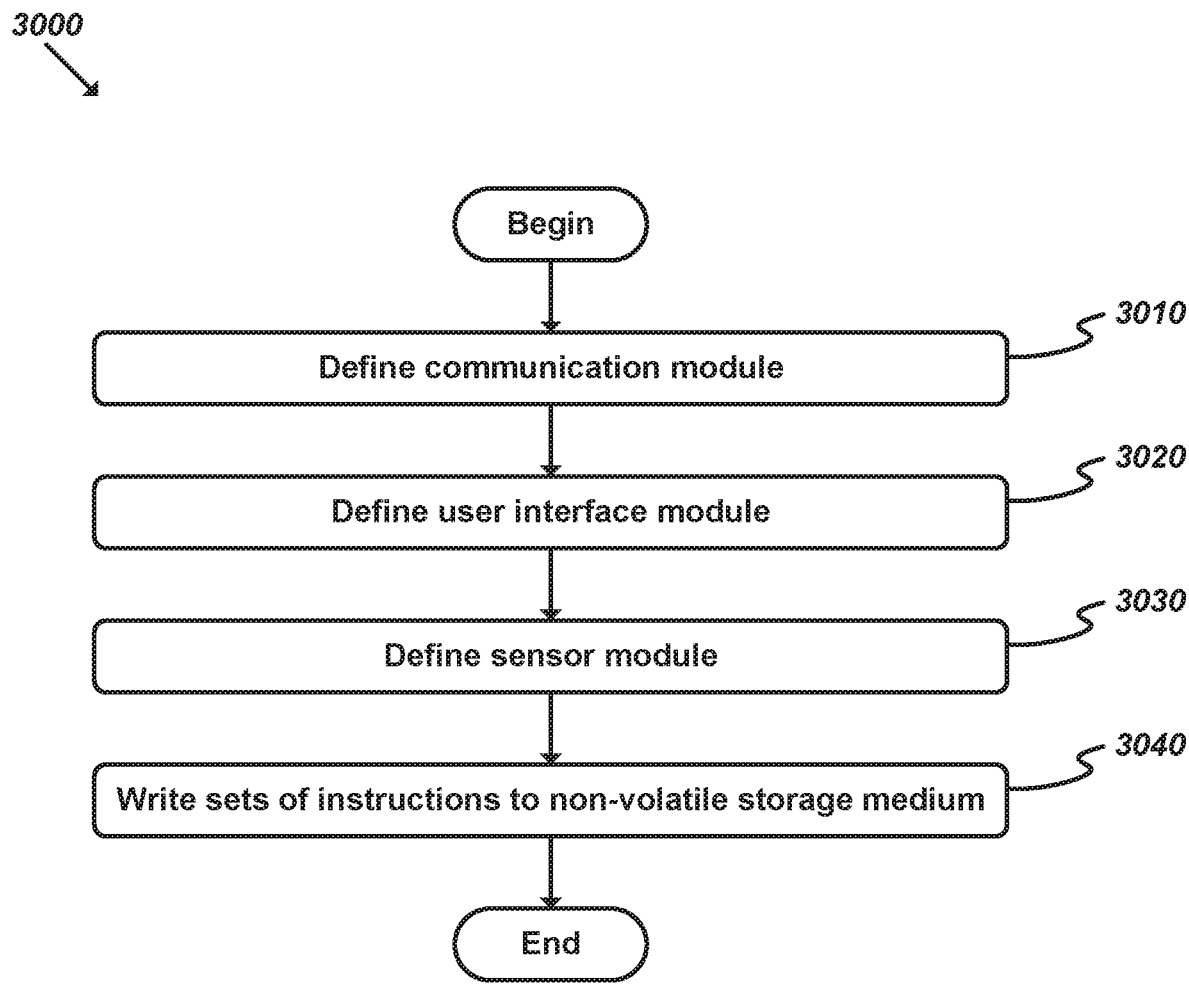
FIG. 30 illustrates an exemplary process of some embodiments for defining and storing a client-side user application of some embodiments.

FIG. 30 illustrates an exemplary process 3000 of some embodiments for defining and storing a client-side user application of some embodiments, such as application 1200 described above in reference to FIG. 12. Specifically, process 3000 illustrates the operations used to define sets of instructions for providing several of the elements shown in the client-side user application 1200 and for performing various operations described above.

As shown, the process may define (at 3010) sets of instructions for providing a communication module. The process may then define (at 3020) sets of instructions for providing a user interface module. Next, the process may define (at 3030) sets of instructions for providing a sensor module. Process 3000 may then write (at 3040) the sets of instructions defined at operations 3010-3030 to a non-volatile storage medium.

Figure 31:
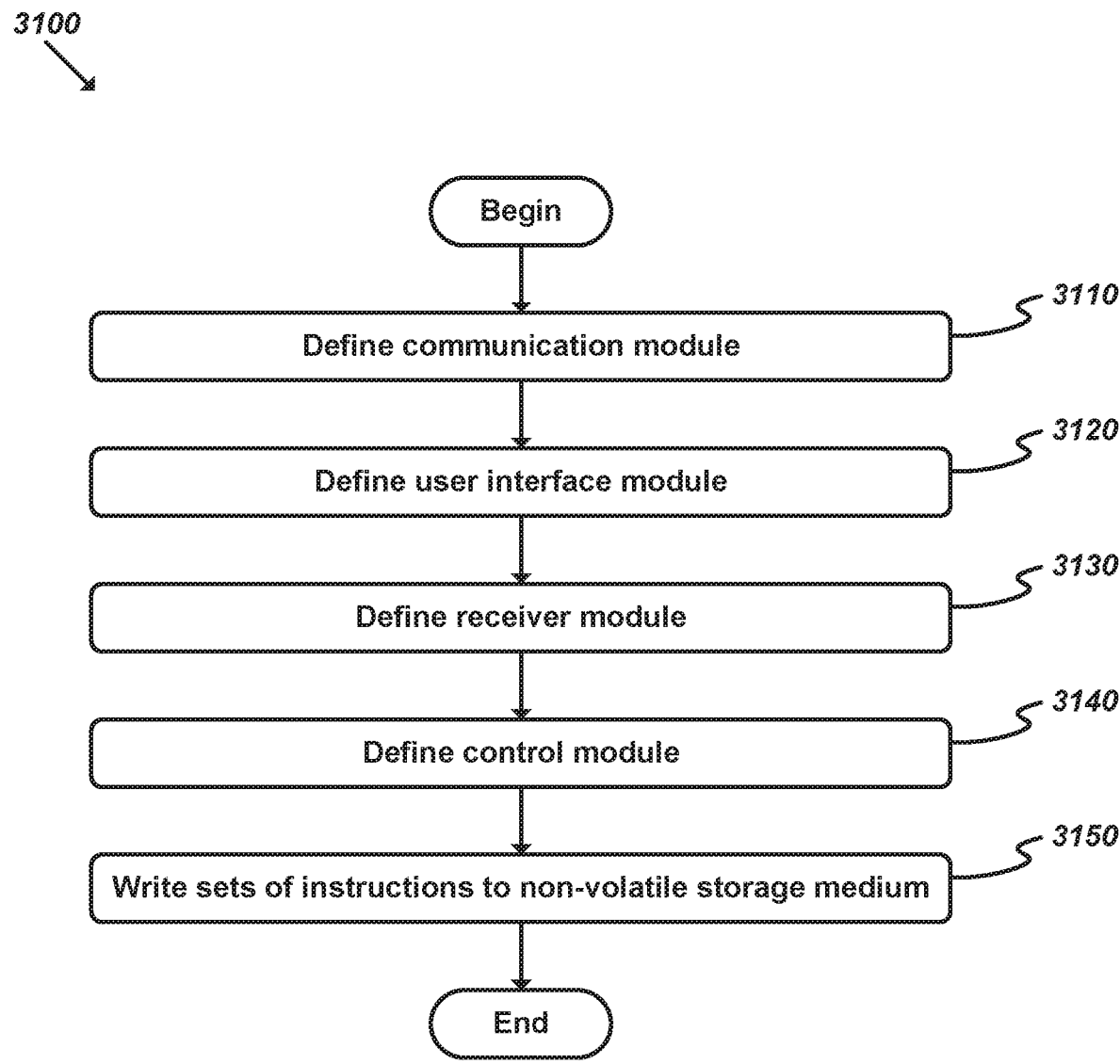
FIG. 31 illustrates an exemplary process of some embodiments for defining and storing a client-side consumer application of some embodiments.

FIG. 31 illustrates an exemplary process 3100 of some embodiments for defining and storing a client-side consumer application of some embodiments, such as application 1300 described above in reference to FIG. 13. Specifically, process 3100 illustrates the operations used to define sets of instructions for providing several of the elements shown in the client-side application 1300 and for performing various operations described above.

As shown, the process may define (at 3110) sets of instructions for providing a communication module. The process may then define (at 3120) sets of instructions for providing a user interface module. Next, the process may define (at 3130) sets of instructions for providing a receiver module. Process 3100 may then define (at 3140) sets of instructions for providing a control module. The process may then write (at 3150) the sets of instructions defined at operations 3110-3140 to a non-volatile storage medium.

Figure 32:
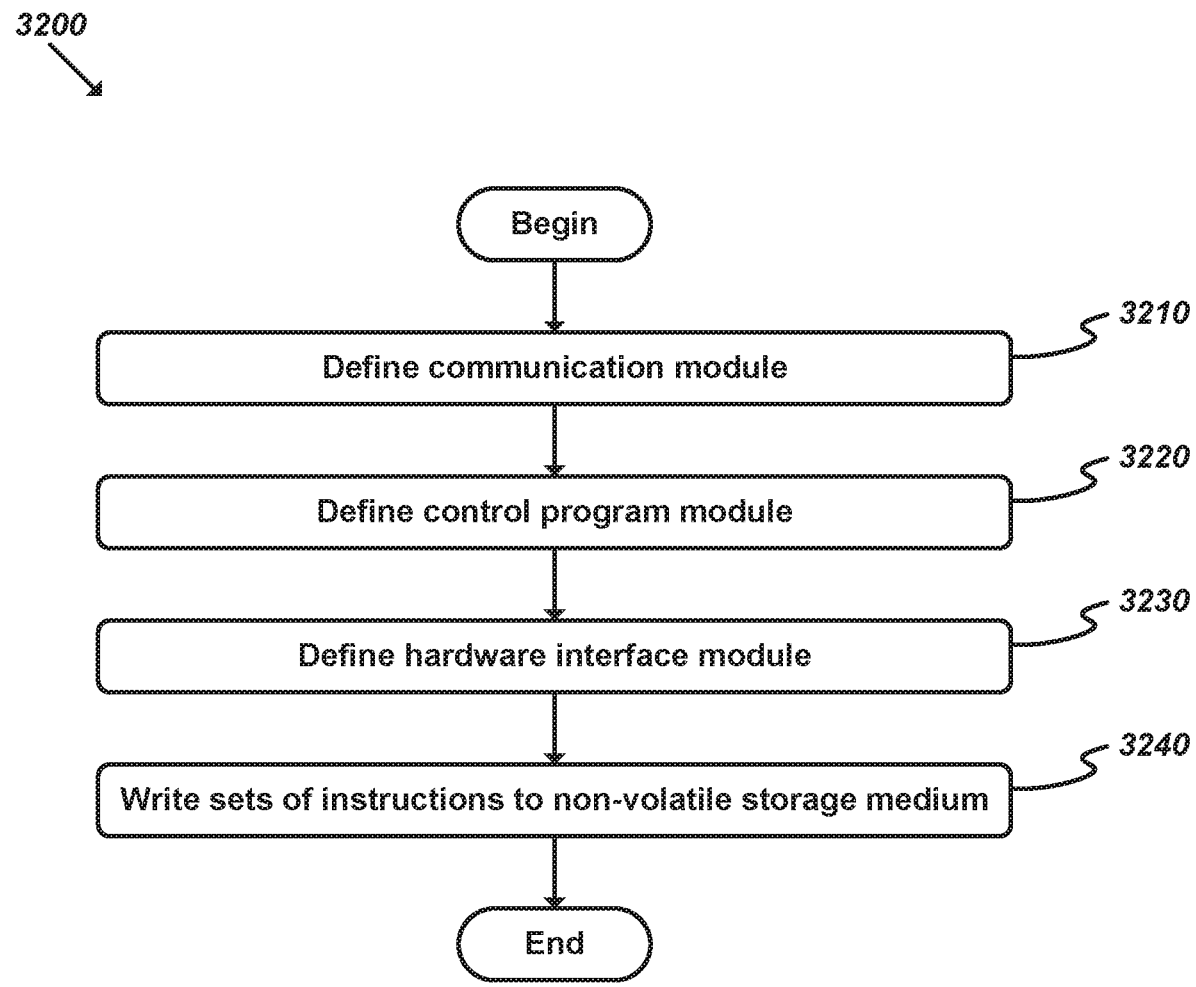
FIG. 32 illustrates an exemplary process of some embodiments for defining and storing a sensor application of some embodiments.

FIG. 32 illustrates an exemplary process 3200 of some embodiments for defining and storing a sensor application of some embodiments, such as application 1400 described above in reference to FIG. 14. Specifically, process 3200 illustrates the operations used to define sets of instructions for providing several of the elements shown in the sensor application 1400 and for performing various operations described above.

As shown, the process may define (at 3210) sets of instructions for providing a communication module. The process may then define (at 3220) sets of instructions for providing a control program module. Next, the process may define (at 3230) sets of instructions for providing a hardware interface module. The process may then write (at 3240) the sets of instructions defined at operations 3210-3230 to a non-volatile storage medium.

One of ordinary skill in the art will recognize that the various sets of instructions defined by processes 2900-3200 are not exhaustive of the sets of instructions that could be defined and established on a non-volatile storage medium for proximity event applications incorporating some embodiments of the invention. In addition, the processes 2900-3200 are exemplary processes, and the actual implementations may vary. For example, different embodiments may define the various sets of instructions in a different order, may define several sets of instructions in one operation, may decompose the definition of a single set of instructions into multiple operations, etc. In addition, the processes 2900-3200 may be implemented as several subprocesses or combined with other operations within a macro-process.

VI. Computer System

Many of the processes and modules described above may be implemented as software processes that are specified as one or more sets of instructions recorded on a non-transitory storage medium. When these instructions are executed by one or more computational element(s) (e.g., microprocessors, microcontrollers, digital signal processors (DSPs), application-specific integrated circuits (ASICs), field programmable gate arrays (FPGAs), etc.) the instructions cause the computational element(s) to perform actions specified in the instructions.

In some embodiments, various processes and modules described above may be implemented completely using electronic circuitry that may include various sets of devices or elements (e.g., sensors, logic gates, analog to digital converters, digital to analog converters, comparators, etc.). Such circuitry may be able to perform functions and/or features that may be associated with various software elements described throughout.

Figure 33:
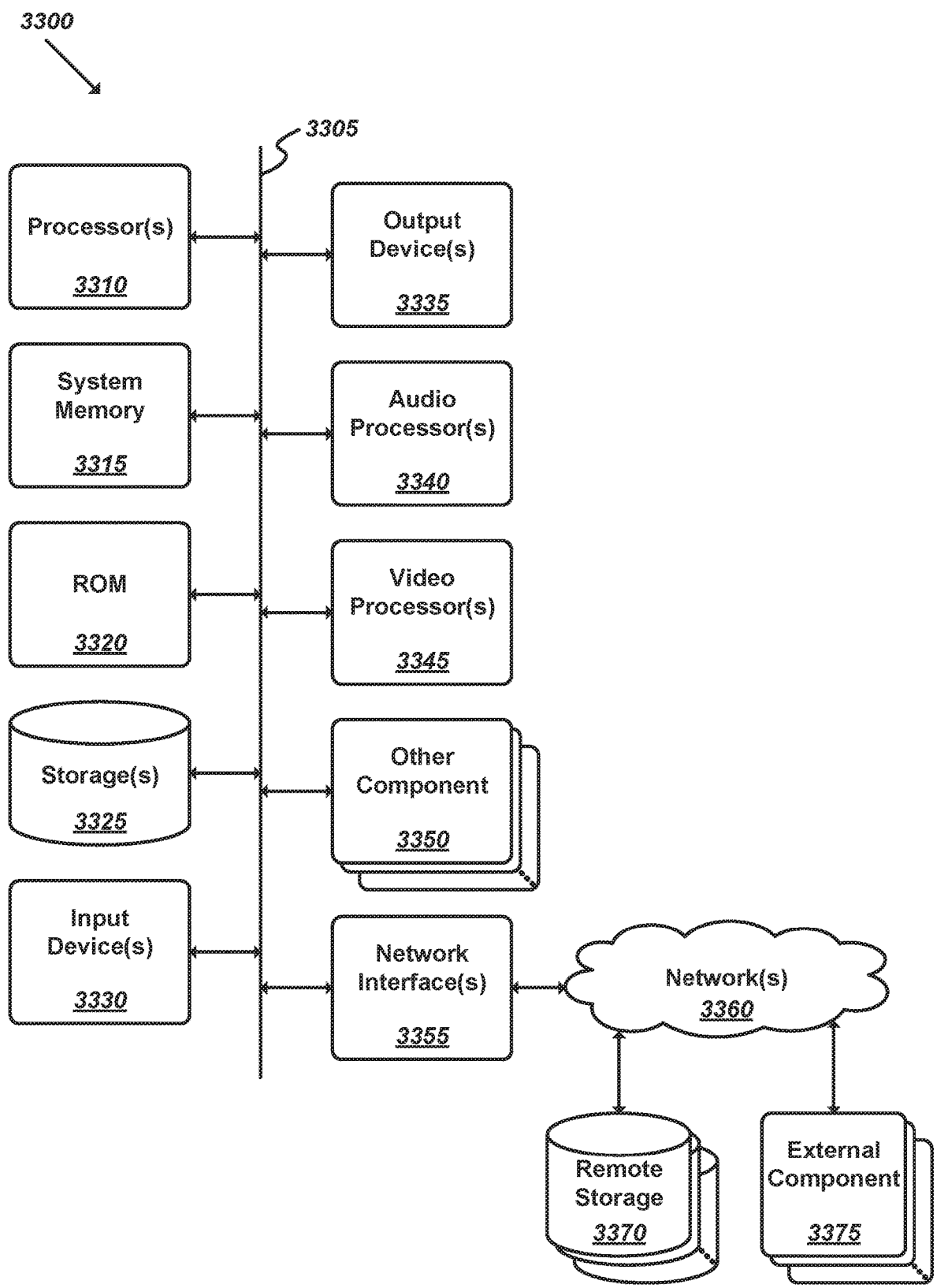
FIG. 33 illustrates a schematic block diagram of an exemplary computer system used to implement some embodiments.

FIG. 33 illustrates a schematic block diagram of an exemplary computer system 3300 used to implement some embodiments. For example, the systems described above in reference to FIGS. 1-4 may be at least partially implemented using computer system 3300. As another example, the processes described in reference to FIGS. 19-27 and 29-32 may be at least partially implemented using sets of instructions that are executed using computer system 3300.

Computer system 3300 may be implemented using various appropriate devices. For instance, the computer system may be implemented using one or more personal computers (PCs), servers, mobile devices (e.g., a smartphone), tablet devices, and/or any other appropriate devices. The various devices may work alone (e.g., the computer system may be implemented as a single PC) or in conjunction (e.g., some components of the computer system may be provided by a mobile device while other components are provided by a tablet device).

As shown, computer system 3300 may include at least one communication bus 3305, one or more processors 3310, a system memory 3315, a read-only memory (ROM) 3320, permanent storage devices 3325, input devices 3330, output devices 3335, audio processors 3340, video processors 3345, various other components 3350, and one or more network interfaces 3355.

Bus 3305 represents all communication pathways among the elements of computer system 3300. Such pathways may include wired, wireless, optical, and/or other appropriate communication pathways. For example, input devices 3330 and/or output devices 3335 may be coupled to the system 3300 using a wireless connection protocol or system.

The processor 3310 may, in order to execute the processes of some embodiments, retrieve instructions to execute and/or data to process from components such as system memory 3315, ROM 3320, and permanent storage device 3325. Such instructions and data may be passed over bus 3305.

System memory 3315 may be a volatile read-and-write memory, such as a random access memory (RAM). The system memory may store some of the instructions and data that the processor uses at runtime. The sets of instructions and/or data used to implement some embodiments may be stored in the system memory 3315, the permanent storage device 3325, and/or the read-only memory 3320. ROM 3320 may store static data and instructions that may be used by processor 3310 and/or other elements of the computer system.

Permanent storage device 3325 may be a read-and-write memory device. The permanent storage device may be a non-volatile memory unit that stores instructions and data even when computer system 3300 is off or unpowered. Computer system 3300 may use a removable storage device and/or a remote storage device as the permanent storage device.

Input devices 3330 may enable a user to communicate information to the computer system and/or manipulate various operations of the system. The input devices may include keyboards, cursor control devices, audio input devices and/or video input devices. Output devices 3335 may include printers, displays, audio devices, etc. Some or all of the input and/or output devices may be wirelessly or optically connected to the computer system 3300.

Audio processor 3340 may process and/or generate audio data and/or instructions. The audio processor may be able to receive audio data from an input device 3330 such as a microphone. The audio processor 3340 may be able to provide audio data to output devices 3340 such as a set of speakers. The audio data may include digital information and/or analog signals. The audio processor 3340 may be able to analyze and/or otherwise evaluate audio data (e.g., by determining qualities such as signal to noise ratio, dynamic range, etc.). In addition, the audio processor may perform various audio processing functions (e.g., equalization, compression, etc.).

The video processor 3345 (or graphics processing unit) may process and/or generate video data and/or instructions. The video processor may be able to receive video data from an input device 3330 such as a camera. The video processor 3345 may be able to provide video data to an output device 3340 such as a display. The video data may include digital information and/or analog signals. The video processor 3345 may be able to analyze and/or otherwise evaluate video data (e.g., by determining qualities such as resolution, frame rate, etc.). In addition, the video processor may perform various video processing functions (e.g., contrast adjustment or normalization, color adjustment, etc.). Furthermore, the video processor may be able to render graphic elements and/or video.

Other components 3350 may perform various other functions including providing storage, interfacing with external systems or components, etc.

Finally, as shown in FIG. 33, computer system 3300 may include one or more network interfaces 3355 that are able to connect to one or more networks 3360. For example, computer system 3300 may be coupled to a web server on the Internet such that a web browser executing on computer system 3300 may interact with the web server as a user interacts with an interface that operates in the web browser. Computer system 3300 may be able to access one or more remote storages 3370 and one or more external components 3375 through the network interface 3355 and network 3360. The network interface(s) 3355 may include one or more application programming interfaces (APIs) that may allow the computer system 3300 to access remote systems and/or storages and also may allow remote systems and/or storages to access computer system 3300 (or elements thereof).

As used in this specification and any claims of this application, the terms "computer", "server", "processor", and "memory" all refer to electronic devices. These terms exclude people or groups of people. As used in this specification and any claims of this application, the term "non-transitory storage medium" is entirely restricted to tangible, physical objects that store information in a form that is readable by electronic devices. These terms exclude any wireless or other ephemeral signals.

It should be recognized by one of ordinary skill in the art that any or all of the components of computer system 3300 may be used in conjunction with some embodiments. Moreover, one of ordinary skill in the art will appreciate that many other system configurations may also be used in conjunction with some embodiments or components of some embodiments.

In addition, while the examples shown may illustrate many individual modules as separate elements, one of ordinary skill in the art would recognize that these modules may be combined into a single functional block or element. One of ordinary skill in the art would also recognize that a single module may be divided into multiple modules.

The foregoing relates to illustrative details of exemplary embodiments and modifications may be made without departing from the scope of the disclosure as defined by the following claims.

I claim:

1. A smart beacon device comprising:
    a physical connector that couples to a point of sale (POS) terminal and provides two-way communication between the smart beacon and the POS terminal, wherein the POS terminal is not able to process wireless transactions, wherein charge information is received at the smart beacon from the POS terminal across the physical connector;
    a first wireless transceiver that:
        transmits a beacon signal comprising a unique identifier, a unique key, and the charge information received from the POS terminal; and
        receives, from a user device, a response to the beacon signal, the response comprising payment information; and
    a network interface,
    wherein the smart beacon:
        sends, to the POS terminal via the physical connector or to a remote server via the network interface, the charge information and the payment information, and
        receives a processing result comprising a rejection or an authorization.

2. The smart beacon device of claim 1, wherein the network interface is able to communicate across at least one of a Wi-Fi network and a modem.

3. The smart beacon device of claim 1, wherein the physical connector comprises a universal serial bus (USB) connector.

4. The smart beacon device of claim 1 further comprising a second wireless transceiver allowing two-way communication with at least one of a peripheral device and another smart beacon.

5. The smart beacon device of claim 1, wherein the device is housed within one of a box, an identification badge, and an insertable housing.

6. The smart beacon device of claim 5, wherein the insertable housing is one of a subscriber identity module (SIM) card and a micro secure digital (MicroSD) flash card.

7. Smart beacon device of claim 1, wherein the unique key comprises at least one of an encryption key and a decryption key.

8. A point of sale (POS) system comprising:
    a POS terminal;
    a network-accessible payment processing server; and
    an insertable smart beacon communicatively coupled to the POS terminal and able to communicate with the network-accessible payment processing server, wherein the smart beacon comprises:
    a physical connector that couples to the POS terminal and provides two-way communication between the insertable smart beacon and the POS terminal, wherein the POS terminal is not able to process wireless transactions, wherein charge information is received at the insertable smart beacon from the POS terminal across the physical connector;
    a first wireless transceiver that:
    transmits a beacon signal comprising a unique identifier, a unique key, and the charge information received from the POS terminal; and
    receives, from a user device, a response to the beacon signal, the response comprising payment information; and
    a network interface,
    wherein the smart beacon:
    sends, to the POS terminal via the physical connector or to a remote server via the network interface, the charge information and the payment information, and
    receives a processing result comprising a rejection or an authorization.

9. The POS system of claim 8, wherein the user device is a smartphone.

10. The POS system of claim 8, wherein the smart beacon is communicatively coupled to at least one remote relay.

11. The POS system of claim 10, wherein the remote relay is associated with one of a parking gate, turnstile, and vending machine.

12. The POS system of claim 8, wherein the POS terminal is one of a cash register, a tablet, credit card processing device, physical barrier, and a vending machine.

13. The POS system of claim 8, wherein the unique key comprises at least one of an encryption key and a decryption key.

14. An automated method of processing a payment, the method comprising:
    transmitting a beacon signal from a smart beacon communicatively coupled to a point of sale (POS) terminal across a physical connection, wherein the POS terminal is not able to process wireless transactions;
    identifying a consumer check-in event, at the smart beacon, based at least partly on a received response to the beacon signal from a user device;
    receiving, at the smart beacon from the POS terminal, charge information;
    transmitting a beacon signal comprising a unique identifier, a unique key, and the 10 charge information received from the POS terminal;
    receiving, at the smart beacon from the user device, a response to the beacon signal, the response comprising payment information;
    sending, from the smart beacon to a remote processing entity or to the POS terminal, the retrieved charge information and payment information for processing; and
    receiving, at the smart beacon, a processing result comprising a rejection or an authorization.

15. The automated method of claim 14, wherein the charge information from the POS terminal and the processing result are communicated between the smart beacon and the POS terminal across the physical connection.

16. The automated method of claim 14, wherein the payment information from the user device and the processing result are communicated between the smart beacon and the user device across a wireless communication link.

17. The automated method of claim 14, wherein the retrieved charge information and payment information is sent to the remote processing entity by the user device.

18. The automated method of claim 14, wherein the retrieved charge information and payment information is sent to the remote processing entity by the smart beacon.

19. The automated method of claim 14, wherein the consumer check-in event comprises receiving a unique consumer identifier from the user device.

* * * * *